(12) United States Patent
Jomori et al.

(10) Patent No.: US 9,509,004 B2
(45) Date of Patent: Nov. 29, 2016

(54) FUEL CELL SYSTEM AND CONTROL METHOD OF FUEL CELL SYSTEM

(71) Applicant: TOYOTA JIDOSHA KABUSHIKI KAISHA, Toyota-shi, Aichi (JP)

(72) Inventors: Shinji Jomori, Susono (JP); Masaaki Matsusue, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/764,340

(22) PCT Filed: Mar. 21, 2013

(86) PCT No.: PCT/JP2013/001914
§ 371 (c)(1),
(2) Date: Jul. 29, 2015

(87) PCT Pub. No.: WO2014/147662
PCT Pub. Date: Sep. 25, 2014

(65) Prior Publication Data
US 2015/0372329 A1 Dec. 24, 2015

(51) Int. Cl.
| | |
|---|---|
| *H01M 8/04* | (2016.01) |
| *H01M 8/02* | (2016.01) |
| *B60L 3/00* | (2006.01) |
| *B60L 11/18* | (2006.01) |
| *H01M 4/92* | (2006.01) |

(52) U.S. Cl.
CPC ........ *H01M 8/04694* (2013.01); *B60L 3/0053* (2013.01); *B60L 11/1803* (2013.01); *B60L 11/1861* (2013.01); *B60L 11/1885* (2013.01); *B60L 11/1887* (2013.01); *B60L 11/1892* (2013.01); *B60L 11/1894* (2013.01);
(Continued)

(58) Field of Classification Search
CPC .... H01M 8/04; H01M 4/92; H01M 8/04089; H01M 8/04223; H01M 8/04544; H01M 8/04559; H01M 8/04694; B60L 11/1803; B60L 11/1861; B60L 11/1885
See application file for complete search history.

(56) References Cited

U.S. PATENT DOCUMENTS

| | | | |
|---|---|---|---|
| 6,399,231 B1 * | 6/2002 | Donahue | ........... H01M 8/04238 429/431 |
| 2002/0187890 A1 * | 12/2002 | Naka | ........................ B01J 23/60 502/38 |

(Continued)

FOREIGN PATENT DOCUMENTS

| | | |
|---|---|---|
| JP | 2004-152598 A | 5/2004 |
| JP | 2005-085662 A | 3/2005 |

(Continued)

*Primary Examiner* — Kenneth Douyette
(74) *Attorney, Agent, or Firm* — Oliff PLC

(57) ABSTRACT

Fuel cell system mounting fuel cell vehicle including: fuel cells having platinum-containing catalyst as electrode catalyst; cell voltage meter configured to measure cell voltage of fuel cells; and controller controlling fuel cell system, wherein (a) cell voltage meter obtains first cell voltage in predefined idling state of fuel cells, (b) in response to changing operation state of fuel cell vehicle from driving state to stop state, controller changes operation state of fuel cells to idling state, and cell voltage meter obtains second cell voltage of fuel cells in idling state, (c) controller uses difference between first and second cell voltages to obtain recovery process voltage for recovering catalyst of fuel cells and recovery process time duration wherein cell voltage of fuel cells is kept at recovery process voltage, and (d) controller reduces voltage of fuel cells to recovery process voltage for recovery process time duration, preforming recovery process of catalyst.

15 Claims, 11 Drawing Sheets

(52) U.S. Cl.
CPC ............ *B60L11/1898* (2013.01); *H01M 4/92* (2013.01); *H01M 8/0488* (2013.01); *H01M 8/04089* (2013.01); *H01M 8/0497* (2013.01); *H01M 8/04223* (2013.01); *H01M 8/04544* (2013.01); *H01M 8/04559* (2013.01); *H01M 8/04753* (2013.01); *B60L 2210/10* (2013.01); *B60L 2210/40* (2013.01); *B60L 2240/12* (2013.01); *B60L 2240/30* (2013.01); *B60L 2240/36* (2013.01); *B60L 2250/24* (2013.01); *H01M 2250/20* (2013.01); *Y02E 60/50* (2013.01); *Y02T 10/705* (2013.01); *Y02T 10/7044* (2013.01); *Y02T 10/7216* (2013.01); *Y02T 10/7241* (2013.01); *Y02T 90/32* (2013.01); *Y02T 90/34* (2013.01)

(56) References Cited

U.S. PATENT DOCUMENTS

| | | | |
|---|---|---|---|
| 2004/0137292 A1 * | 7/2004 | Takebe | H01M 8/04082 429/429 |
| 2008/0026268 A1 | 1/2008 | Zeng | |
| 2010/0129692 A1 | 5/2010 | Ueda et al. | |
| 2012/0225330 A1 | 9/2012 | Umayahara et al. | |
| 2013/0045431 A1 * | 2/2013 | Han | H01M 8/008 429/431 |

FOREIGN PATENT DOCUMENTS

| | | | |
|---|---|---|---|
| JP | 2006-127788 A | 5/2006 | |
| JP | 2006-128016 A | 5/2006 | |
| JP | 2006-158006 A | 6/2006 | |
| JP | 2007103115 A * | 4/2007 | ............ H01M 8/04 |
| JP | 2008-130358 A | 6/2008 | |
| JP | 2008-192468 A | 8/2008 | |
| JP | 2009-064681 A | 3/2009 | |
| JP | 2010-027297 A | 2/2010 | |
| JP | 2010-086398 A | 4/2010 | |
| JP | 2010-129245 A | 6/2010 | |
| JP | 2010-277704 A | 12/2010 | |
| JP | 2011-086398 A | 4/2011 | |
| JP | 2012-185968 A | 9/2012 | |
| JP | 2013-105654 A | 5/2013 | |
| WO | 2010/015920 A1 | 2/2010 | |

* cited by examiner

FUEL CELL SYSTEM AND CONTROL METHOD OF FUEL CELL SYSTEM

TECHNICAL FIELD

The present invention relates to a fuel cell system and a control method of the fuel cell system.

BACKGROUND ART

A polymer electrolyte fuel cell (hereinafter simply referred to as "fuel cell") generally includes a membrane electrode assembly having electrodes provided on both surfaces of a proton-conductive electrolyte membrane, as a power generation element. A catalyst for accelerating the fuel cell reaction is supported on the electrode. In a fuel cell system mounted on, for example, a fuel cell vehicle, continuous operation of the fuel cell at a high voltage causes formation of an oxide layer on the surface of the catalyst and is likely to reversibly deteriorate the catalytic performance. In such cases, a known technique recovers the catalyst by lowering the potential of the air electrode of the fuel cell (for example, Patent Literature 1).

CITATION LIST

Patent Literature

[PTL1] JP2010-02729 A

SUMMARY OF INVENTION

Technical Problem

The reversible deterioration of the catalyst performance (hereinafter referred to as "performance deterioration") includes the performance deterioration caused by formation of the oxide layer on the surface of the catalyst, as well as performance deterioration caused by a reason other than formation of the oxide layer, for example, performance deterioration caused by poisoning of sulfonic acid derived from a sulfonic acid polymer used for the electrolyte membrane of the fuel cell (hereinafter called "anion poisoning"). It has been found that lowering the potential of the air electrode for a long time recovers the catalyst from the anion poisoning or the like. Lowering the potential of the air electrode, however, increases the electric current in the fuel cell. Lowering the potential of the air electrode for a long time accordingly causes a problem that the fuel consumption of the fuel cell is lowered.

Solution to Problem

In order to solve at least part of the problems described above, the invention may be implemented by the following aspects.

(1) According to one aspect of the invention, there is provided a fuel cell system that is used for a fuel cell vehicle. This fuel cell system comprises: fuel cells having a platinum-containing catalyst as an electrode catalyst; a cell voltage meter that is configured to measure a cell voltage of the fuel cells; and a controller that is configured to control the fuel cell system, wherein (a) the cell voltage meter obtains a first cell voltage in a predefined idling state of the fuel cells, (b) in response to a change in operation state of the fuel cell vehicle from a driving state to a stop state, the controller changes an operation state of the fuel cells to the idling state, and the cell voltage meter obtains a second cell voltage of the fuel cells in the idling state, (c) the controller uses a difference between the first cell voltage and the second cell voltage to obtain a recovery process voltage for recovering the catalyst of the fuel cells and a recovery process time duration in which the cell voltage of the fuel cells is to be kept at the recovery process voltage, and (d) the controller reduces the voltage of the fuel cells to the recovery process voltage for the recovery process time duration, so as to perform a recovery process of the catalyst. In the fuel cell system of this aspect, the controller uses the difference between the first cell voltage and the second cell voltage to obtain the recovery process voltage for recovering the catalyst of the fuel cells and the recovery process time duration in which the cell voltage of the fuel cells is to be kept at the recovery process voltage. The controller reduces the cell voltage of the fuel cells to the recovery process voltage for the recovery process time duration, so as to perform the recovery process of the catalyst of the fuel cells. This suppresses the fuel consumption of the fuel cells from being lowered and ensures the efficient recovery process of the catalyst of the fuel cells.

(2) The fuel cell system according to the aspect before, wherein in the(b), the controller may reduce the cell voltage of the fuel cells to or below 0.6 V before changing the operation state of the fuel cells to the idling state. The fuel cell system of this aspect decreases the cell voltage of the fuel cells to or below 0.6 V before changing the operation state of the fuel cells to the idling state. This recovers the deteriorating performance that is recoverable in a short time. The fuel cell system of this aspect accordingly obtains the recovery process voltage and the recovery process time duration of the higher efficiency for the recovery process that requires a relatively long time duration for recovery, thus ensuring efficient recovery of the catalyst of the fuel cells.

(3) The fuel cell system according to the aspect before, wherein in the (a), prior to a change in operation state of the fuel cell vehicle to the driving state after a start of the fuel cells, the controller reduce the cell voltage of the fuel cells to or below 0.6V and changes the operation state of the fuel cells to the idling state, and then the cell voltage meter obtains a cell voltage in the idling state as the first cell voltage. In the fuel cell system of this aspect, the first cell voltage is the maximum cell voltage after a restart of the fuel cells. The recovery process voltage and the recovery process time duration are obtained, based on a difference for recovery to the maximum cell voltage. This allows for setting of the efficient recovery process voltage and recovery process time duration.

(4) The fuel cell system according to the aspect before, wherein when the difference between the first cell voltage and the second cell voltage is greater than a predetermined value, the controller may decrease the recovery process voltage than when the difference between the first cell voltage and the second cell voltage is equal to the predetermined value. When the difference between the first cell voltage and the second cell voltage is greater than the predetermined value, the performance of the fuel cells is expected to deteriorate more significantly than the performance when the difference between the first cell voltage and the second cell voltage is equal to the predetermined value. The fuel cell system of this aspect decreases the recovery process voltage to allow for recovery of the deteriorating performance in a short time period. This accordingly suppresses the fuel consumption of the fuel cells from being lowered and ensures efficient recovery of the catalyst of the fuel cells.

(5) The fuel cell system according to the aspect before, wherein when the difference between the first cell voltage and the second cell voltage is greater than a predetermined value, the controller may increase the recovery process time duration than when the difference between the first cell voltage and the second cell voltage is equal to the predetermined value. When the difference between the first cell voltage and the second cell voltage is greater than the predetermined value, the performance of the fuel cells is expected to deteriorate more significantly than the performance when the difference between the first cell voltage and the second cell voltage is equal to the predetermined value. The fuel cell system of this aspect increases the recovery process time, so as to ensure the more efficient recovery of the catalyst of the fuel cells.

(6) The fuel cell system according to the aspect before, wherein (e) after the recovery process, the controller may change the operation state of the fuel cell vehicle to the idling state, and the cell voltage meter may newly obtain a second cell voltage of the fuel cells in the idling state, and ( ) when a difference between the newly obtained second cell voltage and the first cell voltage is greater than a specified range, the controller may use the difference between the first cell voltage and the newly obtained second cell voltage to obtain the recovery process voltage and the recovery process time duration. The fuel cell system of this aspect is allowed to continue the recovery process until recovery of the catalyst of the fuel cells.

(7) The fuel cell system according to the aspect before, wherein when the difference between the first cell voltage and the second cell voltage obtained in the (b) is equal to the difference between the first cell voltage and the second cell voltage obtained in the (e), the recovery process voltage obtained in the (f) may be lower than the recovery process voltage obtained in the (c). When the catalyst of the fuel cells is not sufficiently recovered by a previous recovery process, it is expected that the recovery process voltage is not sufficiently low. The fuel cell system of this aspect decreases the recovery process voltage to be lower than the previous recovery process voltage, thus ensuring the more efficient recovery of the catalyst of the fuel cells.

(8) The fuel cell system according to the aspect before, wherein when the difference between the first cell voltage and the second cell voltage obtained in the (b) is equal to the difference between the first cell voltage and the second cell voltage obtained in the (e), the recovery process time duration obtained in the (f) may be longer than the recovery process time duration obtained in the (c). When the catalyst of the fuel cells is not sufficiently recovered by a previous recovery process, it is expected that the recovery process time duration is not sufficiently long in a previous map. The fuel cell system of this aspect increases the recovery process time duration to be longer than the previous recovery process time duration, thus ensuring the more efficient recovery of the catalyst of the fuel cells.

(9) The fuel cell system according to the aspect before, may further comprise a wet state detector that is configured to detect a wet state of the fuel cells, wherein the controller may obtain the recovery process voltage and the recovery process time duration based on the difference between the first cell voltage and the second cell voltage and the wet state. The fuel cell system of this aspect obtains the recovery process voltage and the recovery process time duration by additionally taking into account the wet state of the fuel cells. This ensures the more efficient recovery of the catalyst of the fuel cells.

(10) The fuel cell system according to the aspect before, may further comprise a temperature acquirer that is configured to obtain a temperature of the fuel cells, wherein the controller may perform the recovery process when the temperature of the fuel cells is between a predetermined first temperature and a predetermined second temperature inclusive. The fuel cell system of this aspect performs the recovery process when the temperature of the fuel cells is between the predetermined first temperature and the predetermined temperature inclusive. This allows the recovery process to be performed in the high efficient range and thereby ensures the more efficient recovery of the catalyst of the fuel cells.

(11) The fuel cell system according to the aspect before, wherein the controller may minimize the recovery process voltage when the temperature of the fuel cells is equal to a predetermined third temperature that is between the first temperature and the second temperature, the controller may increase the recovery process voltage as the temperature of the fuel cells approaches from the third temperature to the first temperature, and the controller may increase the recovery process voltage as the temperature of the fuel cells approaches from the third temperature to the second temperature. The fuel cell system of this aspect minimizes the recovery process voltage at the third temperature of the high efficiency, thus ensuring the more efficient recovery of the catalyst of the fuel cells.

(12) The fuel cell system according to the aspect before, wherein the controller may maximize the recovery process time when the temperature of the fuel cells is equal to a predetermined fourth temperature that is between the first temperature and the second temperature, the controller may decrease the recovery process time duration as the temperature of the fuel cells approaches from the fourth temperature to the first temperature, and the controller may decrease the recovery process time duration as the temperature of the fuel cells approaches from the fourth temperature to the second temperature. The fuel cell system of this aspect maximizes the recovery process time at the fourth temperature of the high efficiency, thus ensuring the more efficient recovery of the catalyst of the fuel cells.

(13) The fuel cell system according to the aspect before, may further comprise a gearshift position detector that is configured to detect a gearshift position of the fuel cell vehicle, wherein when the gearshift position is either a parking position or a neutral position, the controller may increase the recovery process time duration. The fuel cell system of this aspect increases the recovery process time duration on the occasion that a vehicle stop in the idling state for a long time is expected. This ensures the more efficient recovery of the catalyst of the fuel cells.

(14) The fuel cell system according to the aspect before, may further comprise a gas flow rate regulator that is configured to regulate an amount of a cathode gas that is to be supplied to the fuel cells, wherein the controller may decrease the amount of the cathode gas that is to be supplied to the fuel cells, so as to lower the recovery process voltage. The fuel cell system of this aspect reduces the amount of the cathode gas to decrease the amount of power generation and decrease the voltage of the fuel cells to a low voltage, thus ensuring the more efficient recovery of the catalyst of the fuel cells.

(15) The fuel cell system according to the aspect before, may further comprise a cathode gas supply piping that is arranged to supply the cathode gas to the fuel cells; a cathode gas discharge piping that is arranged to discharge a cathode off gas from the fuel cells; a bypass valve that is provided in the cathode gas supply piping; and a bypass piping that is arranged to connect the bypass valve with the cathode gas discharge piping, wherein the amount of the cathode gas that is to be supplied to the fuel cells may be decreased by increasing an amount of the cathode gas that is flowed through the bypass piping by the bypass valve. The fuel cell system of this aspect reduces the amount of the cathode catalyst by the simple configuration.

(16) According to one aspect of the invention, there is provided control method of a fuel cell system that is used for a fuel cell vehicle. The fuel cell system includes a fuel cells having a platinum-containing catalyst as an electrode catalyst. This control method comprises the steps of: (a) obtaining a first cell voltage in a predefined idling state of the fuel cells; (b) in response to a change in operation state of the fuel cell vehicle from a driving state to a stop state, changing an operation state of the fuel cells to the idling state and obtaining a second cell voltage of the fuel cells in the idling state; (c) using a difference between the first cell voltage and the second cell voltage to obtain a recovery process voltage for recovering the catalyst of the fuel cells and a recovery process time duration in which the cell voltage of the fuel cells is to be kept at the recovery process voltage; and (d) reducing the voltage of the fuel cells to the recovery process voltage for the recovery process time duration, so as to perform a recovery process of the catalyst. The control method of the fuel cell system of this aspect uses the difference between the first cell voltage and the second cell voltage to obtain the recovery process voltage for recovering the catalyst of the fuel cells and the recovery process time duration in which the cell voltage of the fuel cells is to be kept at the recovery process voltage. The recovery process of the fuel cells is performed by reducing the cell voltage of the fuel cells to the recovery process voltage. This suppresses the fuel consumption of the fuel cells from being lowered and ensures the efficient recovery process of the catalyst of the fuel cells.

The invention may be implemented by various aspects other than the fuel cell system, for example, a control method of the fuel cell system and a fuel cell vehicle.

DESCRIPTION OF EMBODIMENT

Figure 1:
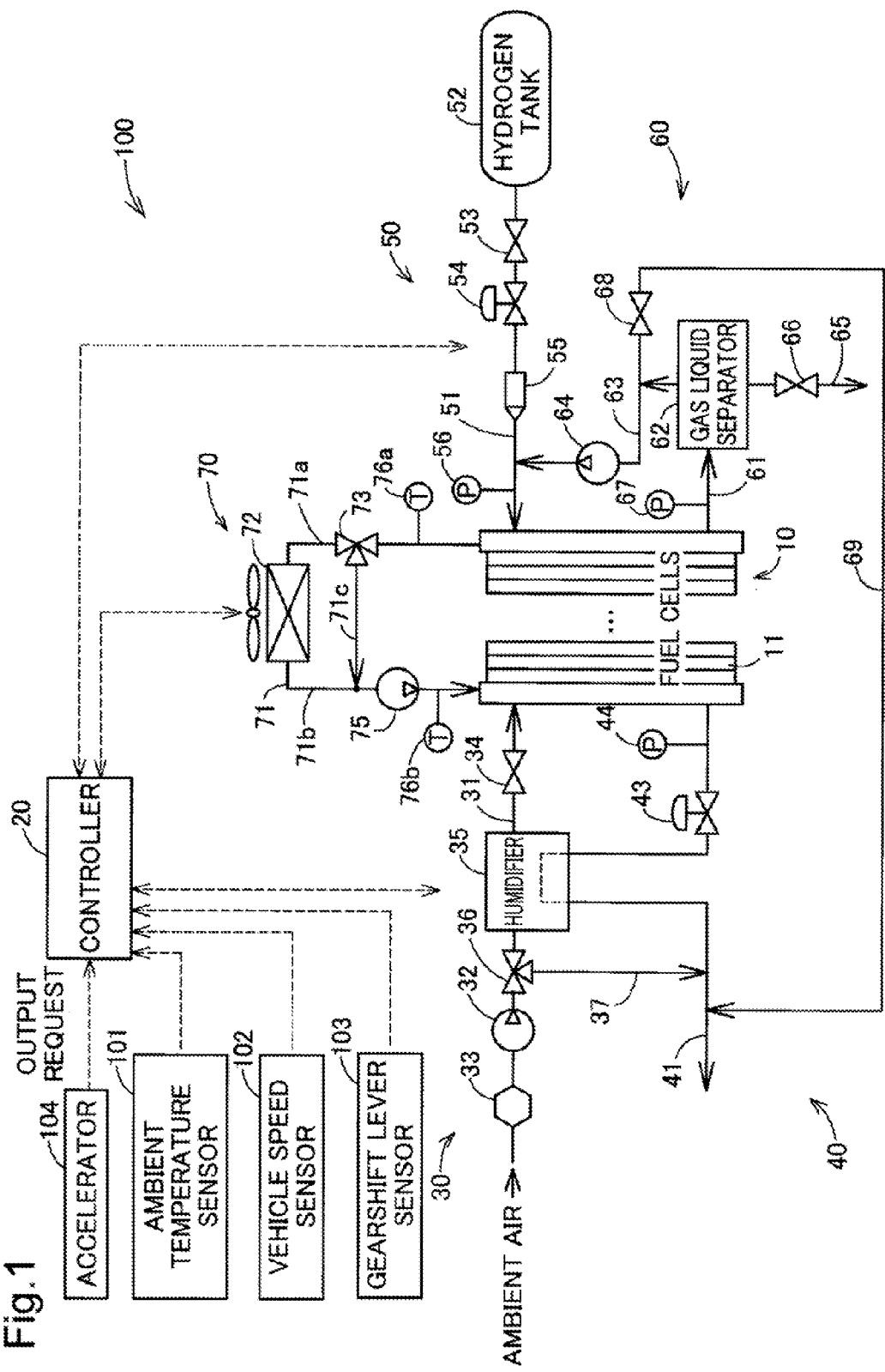
FIG. 1 is a schematic diagram illustrating the configuration of a fuel cell system according to one embodiment of the invention.

First Embodiment:

FIG. 1 is a schematic diagram illustrating the configuration of a fuel cell system according to one embodiment of the invention. This fuel cell system 100 is mounted on, for example, a fuel cell vehicle and is configured to output electric power used as the driving power in response to a driver's request. The fuel cell system 100 includes fuel cells 10, a controller 20, a cathode gas supply assembly 30, a cathode gas discharge assembly 40, an anode gas supply assembly 50, an anode gas circulation/discharge assembly 60 and a cooling medium supply assembly 70.

The fuel cells 10 are polymer electrolyte fuel cells that receive supplies of hydrogen (anode gas) and the air (cathode gas) as reactive gases and generates electricity. The fuel cells 10 have a stack structure in which a plurality of power generation elements 11 called unit cells are stacked. Each of the power generation elements 11 includes a membrane electrode assembly (not shown) as a power generating element that is configured by mounting electrodes on respective surfaces of an electrolyte membrane and two separators (not shown) that are placed across the membrane electrode assembly.

The electrolyte membrane is a thin film of a solid polymer having good proton conductivity in the wet state, for example, perfluorocarbon sulfonic acid polymer. The electrode is comprised of conductive particles which a catalyst for accelerating the reaction for power generation is supported on. The catalyst employed may be, for example, platinum (Pt), and the conductive particles employed may be, for example, carbon (C) particles.

The controller 20 is implemented by a microcomputer including a central processing unit and a main storage unit. The controller 20 receives a request for outputting electric power and controls the respective constituents described below to perform power generation of the fuel cells 10, in response to this request.

The cathode gas supply assembly 30 includes a cathode gas piping 31, an air compressor 32, an air flow meter 33, an on-off valve 34, a humidifier 35 and a bypass valve 36. The cathode gas piping 31 is a pipe connected with the cathode side of the fuel cells 10. The air compressor 32 is connected with the fuel cells 10 via the cathode gas piping 31 and is configured to compress the intake ambient air and supply the compressed air as the cathode gas to the fuel cells 10.

The air flow meter 33 is provided in the upstream of the air compressor 32 and is configured to measure the amount of the ambient air that is to be taken in by the air compressor 32 and send the measurement value to the controller 20. The controller 20 operates the air compressor 32 based on this measurement value to regulate the amount of air supply to the fuel cells 10.

The on-off valve 34 is provided between the air compressor 32 and the fuel cells 10 and is opened and closed according to the flow of the air in the cathode gas piping 31. More specifically, the on-off valve 34 is a normally closed valve and is opened when the air of a predetermined pressure is supplied from the air compressor 32 to the cathode gas piping 31.

The humidifier 35 humidifies the high pressure air output from the air compressor 32. In order to keep the electrolyte membrane in the wet state and ensure the good proton conductivity, the controller 20 controls the amount of humidification by the humidifier 35 with regard to the air to be supplied to the fuel cells 10 and regulates the wet state in the fuel cells 10. The humidifier 35 is connected with a cathode off gas piping 41 and uses the wet state in the off gas for humidification of the high pressure air.

The cathode gas discharge assembly 40 includes the cathode off gas piping 41, a pressure regulator 43 and a pressure measurement unit 44. The cathode off gas piping 41 is a pipe connected with the cathode side of the fuel cells 10 and is configured to discharge a cathode off gas out of the fuel cell system 100. The pressure regulator 43 regulates the pressure of the cathode off gas in the cathode off gas piping 41 (back pressure on the cathode side of the fuel cells 10). The pressure measurement unit 44 is provided in the upstream of the pressure regulator 43 and is configured to measure the pressure of the cathode off gas and send the measurement value to the controller 20. The controller 20 adjusts the opening of the pressure regulator 43 based on the measurement value of the pressure measurement unit 44.

The bypass valve 36 is placed between the air compressor 32 and the humidifier 35. The bypass valve 36 and the cathode off gas piping 41 are interconnected by a cathode gas bypass piping 37. The bypass valve 36 is configured to flow the high pressure air output from the air compressor 32 to the humidifier 35 during normal operation of the fuel cells 10 and to flow part of the high pressure air output from the air compressor 32 through the cathode gas bypass piping 37 to the cathode off gas piping 41 during recovery operation for recovering the catalytic activity of the fuel cells 10 as described later.

The anode gas supply assembly 50 includes an anode gas piping 51, a hydrogen tank 52, an on-off valve 53, a regulator 54, a hydrogen supply unit 55 and a pressure measurement unit 56. The hydrogen tank 52 is connected with the anode of the fuel cells 10 via the anode gas piping 51 and is provided to supply hydrogen filled in the tank to the fuel cells 10. The fuel cell system 100 may include a reformer that is configured to reform a hydrocarbon-based fuel and generate hydrogen as the hydrogen supply source, in place of the hydrogen tank 52.

The on-off valve 53, the regulator 54, the hydrogen supply unit 55 and the pressure measurement unit 56 are provided in this sequence from the upstream side (hydrogen tank 52-side). The on-off valve 53 is opened and closed in response to a command from the controller 20 to control the inflow of hydrogen from the hydrogen tank 52 to the upstream side of the hydrogen supply unit 55. The regulator 54 is a pressure reducing valve configured to regulate the pressure of hydrogen in the upstream of the hydrogen supply unit 55. The opening of the regulator 54 is controlled by the controller 20.

The hydrogen supply unit 55 may be implemented by, for example, an injector that is an electromagnetically-driven on-off valve. The pressure measurement unit 56 is configured to measure the pressure of hydrogen in the downstream of the hydrogen supply unit 55 and send the measurement value to the controller 20. The controller 20 controls the hydrogen supply unit 55 based on the measurement value of the pressure measurement unit 56, so as to regulate the amount of hydrogen that is to be supplied to the fuel cells 10.

The anode gas circulation/discharge assembly 60 includes an anode off gas piping 61, a gas liquid separator 62, an anode gas circulation piping 63, a hydrogen circulation pump 64, an anode water discharge piping 65, a water discharge valve 66, a pressure measurement unit 67, an anode off gas discharge valve 68 and an anode off gas discharge piping 69. The anode off gas piping 61 is a pipe provided to connect the outlet of the anode of the fuel cells 10 with the gas liquid separator 62 and introduces an anode off gas including unreacted gases (for example, hydrogen and nitrogen) that are not used for the reaction for power generation to the gas liquid separator 62.

The gas liquid separator 62 is connected with the anode gas circulation piping 63 and with the anode water discharge piping 65. The gas liquid separator 62 is configured to separate a gas component and water content included in the anode off gas and introduce the gas component to the anode gas circulation piping 63 while introducing the water content to the anode water discharge piping 65.

The anode gas circulation piping 63 is connected with the downstream side of the hydrogen supply unit 55 in the anode gas piping 51. The hydrogen circulation pump 64 is provided in the anode gas circulation piping 63 and serves to pump out hydrogen included in the gas component separated by the gas liquid separator 62 to the anode gas piping 51. As described above, the configuration of the fuel cell system 100 circulates hydrogen included in the anode off gas and resupplies the hydrogen to the fuel cells 10, thus improving the use efficiency of hydrogen.

The anode gas circulation piping 63 is connected with the cathode off gas piping 41 by the anode off gas discharge valve 68 and the anode off gas discharge piping 69. In the fuel cells 10, the reaction proceeds with the supply of the cathode gas (the air) to one surface of the membrane electrode assembly and the supply of the anode gas (hydrogen) to the other surface. Nitrogen or the like included in the cathode gas moves through the membrane electrode assembly toward the anode side. The anode gas is, on the other hand, circulated as described above. This results in increasing the partial pressure of nitrogen in the anode gas and decreasing the partial pressure of hydrogen. The anode off gas discharge valve 68 is opened at regular intervals or in response to a decrease in partial pressure of hydrogen, so that the anode off gas including nitrogen is discharged through the anode off gas discharge piping 69 to the atmosphere. The anode off gas includes unreacted hydrogen. The anode off gas is thus not directly discharged from the anode off gas piping 69 to the atmosphere but is discharged to the cathode off gas piping 41 to be diluted with the cathode off gas in the cathode off gas piping 41 and then discharged to the atmosphere.

The anode water discharge piping 65 is a pipe provided to discharge the water content separated by the gas liquid separator 62 out of the fuel cell system 100. The water discharge valve 66 is provided in the anode water discharge piping 65 and is opened and closed in response to a command from the controller 20. The controller 20 generally closes the water discharge valve 66 during operation of the fuel cell system 100 and opens the water discharge valve 66 at a predetermined water discharge timing or at a discharge timing of an inert gas included in the anode off gas.

The pressure measurement unit 67 of the anode gas circulation/discharge assembly 60 is provided in the anode off gas piping 61. The pressure measurement unit 67 is configured to measure the pressure of the anode off gas (back pressure on the anode side of the fuel cells 10) in the neighborhood of the outlet of a hydrogen manifold of the fuel cells 10 and send the measurement value to the controller 20.

The cooling medium supply assembly 70 includes a cooling medium piping 71, a radiator 72, a three-way valve 73, a cooling medium circulation pump 75 and two cooling medium temperature measurement units 76a and 76b. The cooling medium piping 71 is a pipe provided to circulate a cooling medium for cooling down the fuel cells 10 and includes an upstream-side piping 71a, a downstream-side piping 71b and a bypass piping 71c.

The upstream-side piping 71a is arranged to connect an outlet manifold for the cooling medium provided in the fuel cells 10 with the inlet of the radiator 72. The downstream-side piping 71b is arranged to connect an inlet manifold for the cooling medium provided in the fuel cells 10 with the outlet of the radiator 72. The bypass piping 71c has one end connected with the upstream-side piping 71a via the three-way valve 73 and the other end connected with the downstream-side piping 71b. The controller 20 controls the opening and closing of the three-way valve 73 to regulate the amount of inflow of the cooling medium to the bypass piping 71c and thereby regulate the amount of inflow of the cooling medium to the radiator 72.

The radiator 72 is provided in the cooling medium piping 71 and is configured to cool down the cooling medium by heat exchange between the cooling medium flowing in the cooling medium piping 71 and the ambient air. The cooling medium circulation pump 75 is provided on the downstream side of the joint with the bypass piping 71c in the downstream-side piping 71b (cooling medium inlet side of the fuel cells 10) and is operated in response to a command from the controller 20.

The two cooling medium temperature measurement units 76a and 76b are respectively provided in the upstream-side piping 71a and in the downstream-side piping 71b and are configured to send the respective measurement values to the controller 20. The controller 20 detects an operating temperature of the fuel cells 10 from the difference between the respective measurement values of the cooling medium temperature measurement units 76a and 76b. The controller 20 then controls the rotation speed of the cooling medium circulation pump 75 based on the detected operating temperature of the fuel cells 10, so as to regulate the operating temperature of the fuel cells 10.

The fuel cell system 100 further includes an ambient temperature sensor 101, a vehicle speed sensor 102, a gearshift lever sensor 103 and an accelerator 104 which are provided to obtain vehicle-related information of the fuel cell vehicle. The accelerator 104 is configured to detect the driver's output request and send the output request to the controller 20. The ambient temperature sensor 101 is configured to detect the ambient temperature outside of the fuel cell vehicle and send the detected ambient temperature to the controller 20. The vehicle speed sensor 102 is configured to detect the current speed of the fuel cell vehicle and send the detected current speed to the controller 20. The gearshift lever sensor 103 is configured to obtain the position of a gearshift lever (not shown) (for example, P (parking), R (reverse), N (neutral), D (drive) or B (forward or regenerative brake). The controller 20 adequately uses the information obtained from these sensors for output control and recovery operation control of the fuel cells 10. The fuel cell system 100 may additionally include a parking brake sensor.

Figure 2:
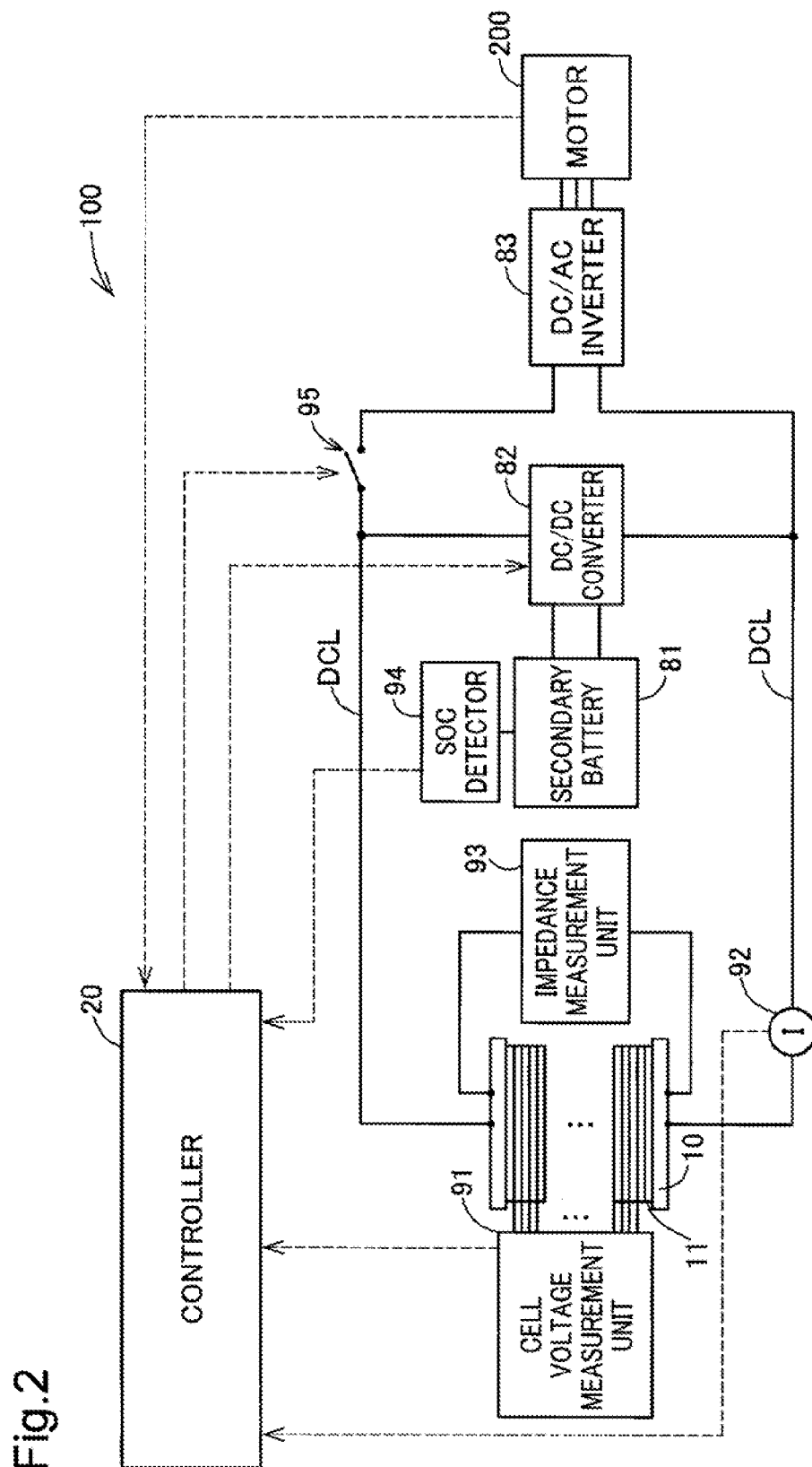
FIG. 2 is a schematic diagram illustrating the electrical configuration of the fuel cell system.

FIG. 2 is a schematic diagram illustrating the electrical configuration of the fuel cell system 100. The fuel cell system 100 includes a secondary battery 81, a DC/DC converter 82 and a DC/AC inverter 83. The fuel cell system 100 also includes a cell voltage measurement unit 91, a current measurement unit 92, an impedance measurement unit 93 and an SOC detector 94.

The fuel cells 10 are connected with the DC/AC inverter 83 via a DC line DCL. The DC/AC inverter 83 is connected with a motor 200 that is the driving power source of the fuel cell vehicle. The secondary battery 81 is connected with the DC line DCL via the DC/DC converter 82.

The secondary battery 81 serves, along with the fuel cells 10, as the electric power supply source. The secondary battery 81 may be implemented by, for example, a lithium ion battery. The controller 20 controls the DC/DC converter 82 to control the electric current and the voltage of the fuel cells 10 and the charging and discharging of the secondary battery 81 and variably adjust the voltage level of the DC line DCL.

The secondary battery 81 is connected with the SOC detector 94. The SOC detector 94 is configured to detect the SOC (state of charge) that is the charging state of the secondary battery 81 and send the detected SOC to the controller 20. The SOC of the secondary battery 81 denotes a ratio of the remaining amount of charge (storage amount) of the secondary battery 81 to the charging capacity of the secondary battery 81. The SOC detector 94 detects the SOC of the secondary battery 81 by measuring the temperature, the electric power and the electric current of the secondary battery 81.

The controller 20 controls the charging and discharging of the secondary battery 81 based on the detection value of the SOC detector 94, such that the SOC of the secondary battery 81 is kept in a predetermined range. More specifically, when the SOC of the secondary battery 81 obtained from the SOC detector 94 is lower than a predetermined lower limit value, the controller 20 charges the secondary battery 81 with the electric power output from the fuel cells 10. When the SOC of the secondary battery 81 is higher than a predetermined upper limit value, the controller 20 discharges the secondary battery 81.

The DC/AC inverter 83 is configured to convert the DC power obtained from the fuel cells 10 and the secondary battery 81 into AC power and supply the AC power to the motor 200. When the motor 200 generates the regenerative electric power, the DC/AC inverter 83 converts the regenerative electric power to DC power. The regenerative electric power converted to DC power is accumulated into the secondary battery 81 via the DC/DC converter 82.

The cell voltage measurement unit 91 is connected with the respective power generation elements 11 of the fuel cells 10 and is configured to measure the voltage of each power generation element 11 (cell voltage). The cell voltage measurement unit 91 sends the measurement results to the controller 20. Alternatively the cell voltage measurement unit 91 may send only the minimum cell voltage among the measured cell voltages to the controller 20.

The current measurement unit 92 is connected with the DC line DCL and is configured to measure the electric current output from the fuel cells 10 and send the measured electric current to the controller 20. When there are differences between the observed values and target values (control values) of the cell voltage and the electric current, the controller 20 performs feedback control that corrects the control values such as to converge the differences.

The impedance measurement unit 93 is connected with the fuel cells 10 and is configured to measure the impedance of the entire fuel cells 10 by applying AC current to the fuel cells 10 and send the measured impedance to the controller 20. The controller 20 manages the wet state of the electrolyte membrane of the fuel cells 10, based on the measurement result of the impedance measurement unit 93. An on-off switch 95 is provided in the DC line DCL to control electrical connections of the fuel cells 10 and the secondary battery 81 with the motor 200, in response to a command from the controller 20. The controller 20 may use the measurement value of a specified power generation element 11 in impedance measurement by the impedance measurement unit 93.

It is known that the power generation performance of the fuel cells 10 (catalytic activity of the fuel cells 10) is lowered during operation of the fuel cell vehicle. The controller 20 accordingly controls the fuel cells 10 to perform recovery operation for recovering the power generation performance of the fuel cells 10 (catalytic activity of the fuel cells 10) in the idling state in which the fuel cells 10 have small load. The "idling state" herein denotes the state that the driver turns off the accelerator of the fuel cell vehicle to stop the supply of driving power to the drive wheels of the fuel cell vehicle, that the supply of electric power continues for the gas supplies for power generation and the cooling medium supply and to auxiliary equipment such as air conditioner, indicators and headlights, and that the cell voltage of the fuel cells 10 is kept higher than 0.6 V. The idling state may be the state that the fuel cell vehicle is temporarily stopped to wait for a traffic light or the state that the driver does not depress the accelerator pedal on a downhill. In the idling state, the controller 20 may be allowed to decrease the supply amounts of the anode gas and the cathode gas to the fuel cells 10 compared with the supply amounts during normal operation.

Figure 3:
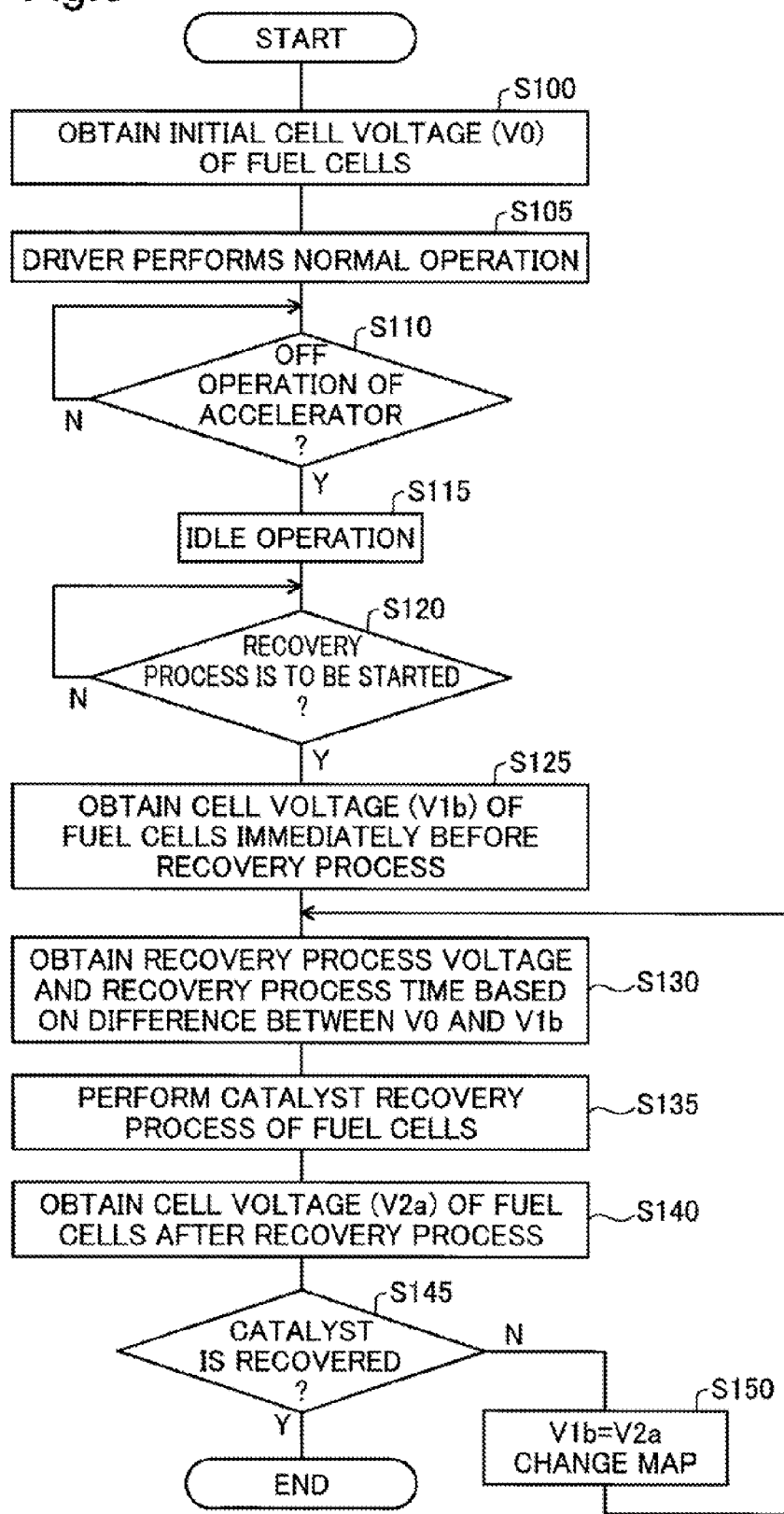
FIG. 3 is a flowchart showing one example of catalyst recovery process of the fuel cells.
Figure 4:
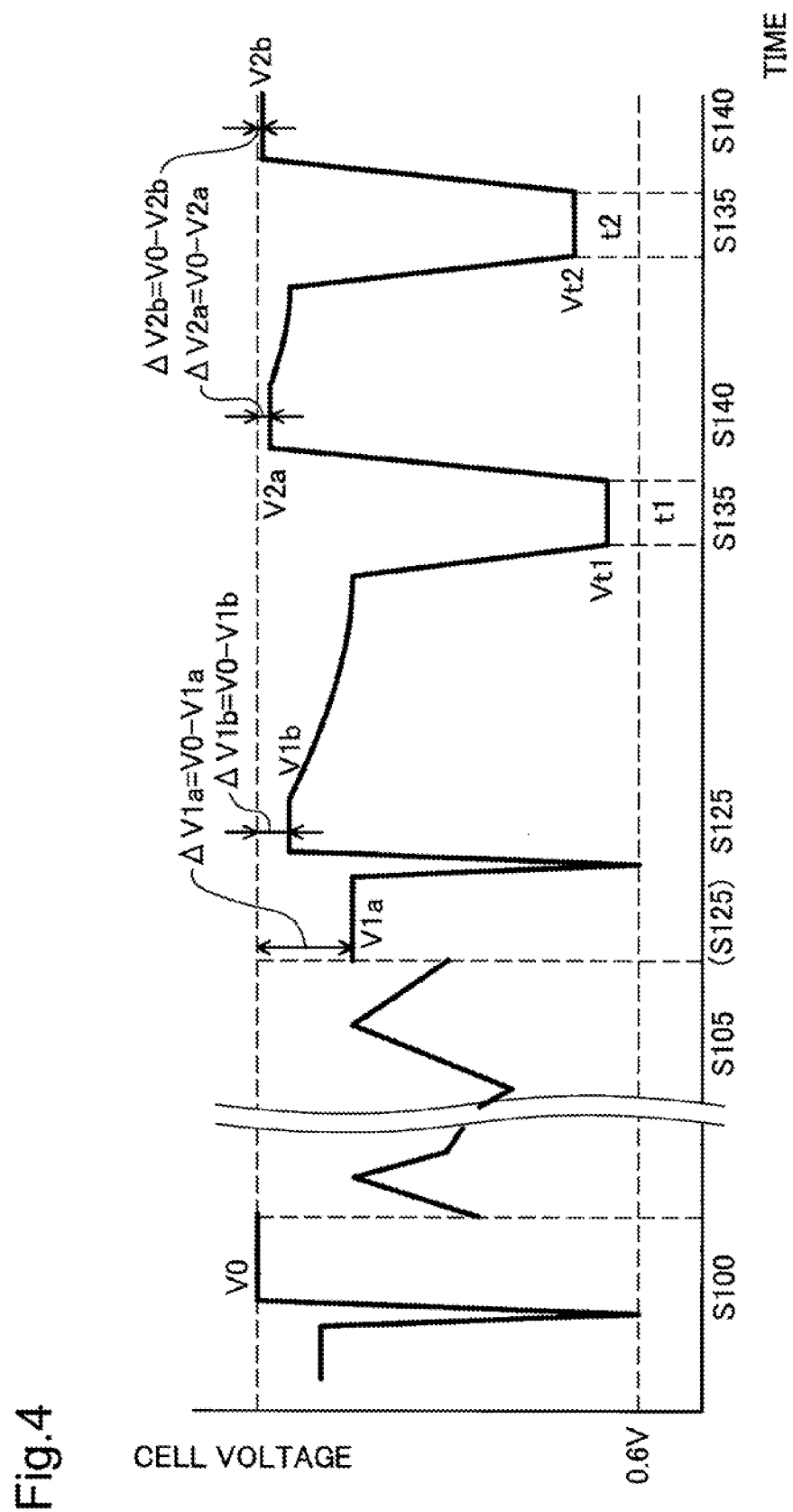
FIG. 4 is a graph showing a variation in voltage of the fuel cells through the catalyst recovery process of the fuel cells after a start of the fuel cells.

FIG. 3 is a flowchart showing one example of catalyst recovery process of the fuel cells. FIG. 4 is a graph showing a variation in voltage of the fuel cells through the catalyst recovery process of the fuel cells after a start of the fuel cells.

At step S100, the controller 20 obtains an initial cell voltage V0 of the fuel cells 10 in the initial idling state. After starting the fuel cells 10, prior to a start of the fuel cell vehicle, the controller 20 decreases the voltages of the individual power generation elements 11 of the fuel cells 10 (hereinafter called "cell voltage") to or below 0.6 V, subsequently sets the fuel cells 10 in the idling state and obtains the cell voltage V0 at the initial stage of the fuel cells 10 (hereinafter called "initial cell voltage V0"). The initial cell voltage V0 denotes a maximum voltage which the power generation element 11 of the fuel cells 10 is allowed to generate in the idling state until operation of the fuel cells 10 is terminated after a current start of the fuel cells 10.

The fuel cells 10 include the plurality of power generation elements 11. As described above, the cell voltage measurement unit 91 measures the cell voltage of each of the power generation elements 11. In this embodiment and subsequent embodiments, the cell voltage may be an average value of the cell voltages of the plurality of power generation elements 11. In another example, the cell voltage may be the cell voltage of a power generation element 11 having the minimum voltage among the plurality of power generation elements 11. Alternatively the cell voltage may be the cell voltage of a power generation element 11 having the maximum voltage among the plurality of power generation elements 11.

The continuous use of the fuel cells 10 gradually lowers the catalytic performance by formation of an oxide layer on the catalyst or by anion poisoning that negative ion (anion) such as sulfonic acid ion adheres to the catalyst. Prior to a start of the fuel cells 10, the fuel cells 10 do not generate a voltage and are expected to have a low voltage and thereby little anion poisoning. The oxide layer is readily removable by decreasing the cell voltage of the power generation element 11 of the fuel cells 10 to or below 0.6 V. As a result, the initial cell voltage V0 denotes the maximum voltage which the power generation element 11 of the fuel cells 10 is allowed to generate in the idling state until operation of the fuel cells 10 is terminated after a current start of the fuel cells 10.

At step S105, the driver performs normal operation. The normal operation herein means that the driver depresses the accelerator pedal and drives the fuel cell vehicle at various speeds. At step S105, the driver performs various operations according to the road conditions, so that the cell voltage of the power generation element 11 of the fuel cells 10 is significantly varied depending on the driving conditions. During this normal operation, the catalytic performance of the fuel cells 10 is gradually lowered by gradual formation of an oxide layer on the catalyst or by gradual progress of anion poisoning.

At step S110, the controller 20 detects the driver's off operation of the accelerator 104. The driver's off operation of the accelerator 104 is detected, for example, when the fuel cell vehicle is stopped to wait for a traffic light and the driver releases the accelerator pedal.

At step S115, the controller 20 operates the fuel cells 10 in the idling state. Operation of the fuel cells 10 in the idling state is called "idle operation". At step S120, the controller 20 determines whether a catalyst recovery process of the fuel cells 10 is to be started. The controller 20 may start the recovery process when the fuel cell vehicle becomes in the idling state upon elapse of a predetermined time after the start of the fuel cells 10. In another example, the controller 20 may start the recovery process, based on the cell voltage of the power generation element 11 of the fuel cells 10 in the idling state after a vehicle stop. When the cell voltage is lower than a predetermined voltage, this indicates deterioration of the catalytic performance. It is accordingly preferable to start the recovery process. In the case that the recovery process is started based on the cell voltage of the power generation element 11 of the fuel cells 10 in the idling state after a vehicle stop, the controller 20 may change the sequence of step S120 and step S125 described below.

At step S125, the controller 20 sets the fuel cells 10 in the idling state and obtains a cell voltage V1 (V1a or V1b described below) of the power generation element 11 of the fuel cells 10 immediately before the recovery process. At step S100, the controller 20 decreases the cell voltage of the power generation element 11 of the fuel cells 10 to or below 0.6 V, subsequently sets the fuel cells 10 in the idling state and obtains the initial cell voltage V0 of the fuel cells 10. At step S125, however, the controller 20 may obtain a cell voltage V1a before decreasing the cell voltage of the power generation element 11 of the fuel cells 10 to or below 0.6 V or may obtain a cell voltage V1b after decreasing the cell voltage of the power generation element 11 of the fuel cells 10 to or below 0.6 V and subsequently setting the fuel cells 10 in the idling state. The cell voltage V1b is higher than the cell voltage V1a. This is because decreasing the cell voltage of the power generation element 11 of the fuel cells 10 to or below 0.6 V removes the oxide layer from the catalyst and recovers the catalytic performance of the fuel cells 10 that has been lowered by formation of the oxide layer. The oxide layer is removable in a short time (about 0.1 second), so that it is preferable to use the cell voltage V1b after removal of the oxide layer. The recovery of the cell voltage by decreasing the cell voltage of the power generation element 11 of the fuel cells 10 to or below 0.6 V is only temporary and the cell voltage of the power generation element 11 of the fuel cells 10 is gradually lowered with elapse of time.

At step S130, the controller 20 uses a voltage difference $\Delta V1b$ between the initial cell voltage V0 and the voltage V1b to obtain a cell voltage of the power generation element 11 of the fuel cells 10 for catalyst recovery process of the fuel cells 10 (recovery process voltage Vt1) and a time when the cell voltage of the power generation element 11 of the fuel cells 10 is to be kept at the recovery process voltage (recovery process time duration t1, we call "recovery process time t1"). For example, the relationship of the voltage difference $\Delta V1b$ to the recovery process voltage Vt1 and the recovery process time t1 may be registered in advance in the form of a map. The controller 20 may refer to this map to obtain the recovery process voltage Vt1 and the recovery process time t1 based on the voltage difference $\Delta V1b$. Alternatively the controller 20 may use a voltage difference $\Delta V1a$ between the initial cell voltage V0 and the cell voltage V1a to obtain the recovery process voltage Vt1 and the recovery process time t1. In this latter case, the controller 20 may estimate in advance a performance deterioration (V1b–V1a) of the fuel cells 10 caused by formation of the oxide layer by the rule of thumb, subtract the estimated performance deterioration from the voltage difference $\Delta V1a$ and then refer to the map. In another example, the controller 20 may register the relationship of the voltage difference $\Delta V1a$ to the recovery process voltage Vt1 and the recovery process time t1 in the form of another map and refer to this another map to obtain the recovery process voltage Vt1 and the recovery process time t1 based on the voltage difference $\Delta V1a$.

The recovery process voltage Vt1 is higher than 0.6 V in the illustration of FIG. 4. The recovery process voltage Vt of FIG. 4 is, however, only illustrative. The map may be configured to obtain a value lower than 0.6 V as the value of the recovery process voltage Vt1.

At step S135, the controller 20 decreases the cell voltage of the power generation element 11 of the fuel cells 10 to the recovery process voltage Vt1 and keeps the cell voltage at the recovery process voltage Vt1 for the recovery process time t1, so as to perform the catalyst recovery process of the fuel cells 10. As a method of decreasing the cell voltage to the recovery process voltage Vt1, the controller 20 may keep the fuel cells 10 in the idling state and use the DC/DC converter 82 (shown in FIG. 2) to draw high current from the fuel cells 10 without changing the supply amounts of the cathode gas and the anode gas to the fuel cells 10, so as to decrease the cell voltage of the power generation element 11 of the fuel cells 10. In another example, the controller 20 may decrease the supply amount of the cathode gas to the fuel cells 10 and suppress the reaction for power generation in the fuel cells 10, so as to reduce the cell voltage of the power generation element 11 of the fuel cells 10.

At step S140, the controller 20 obtains a cell voltage V2a in the idling state of the fuel cells 10 after the recovery process. At step S145, the controller 20 determines whether the catalyst of the fuel cells 10 is recovered. For example, the controller 20 may determine that the catalyst of the fuel cells 10 is recovered, when a voltage difference $\Delta V2a$ between the initial cell voltage V0 and the cell voltage V2a after the recovery process is equal to or less than a predetermined value.

Figure 5:
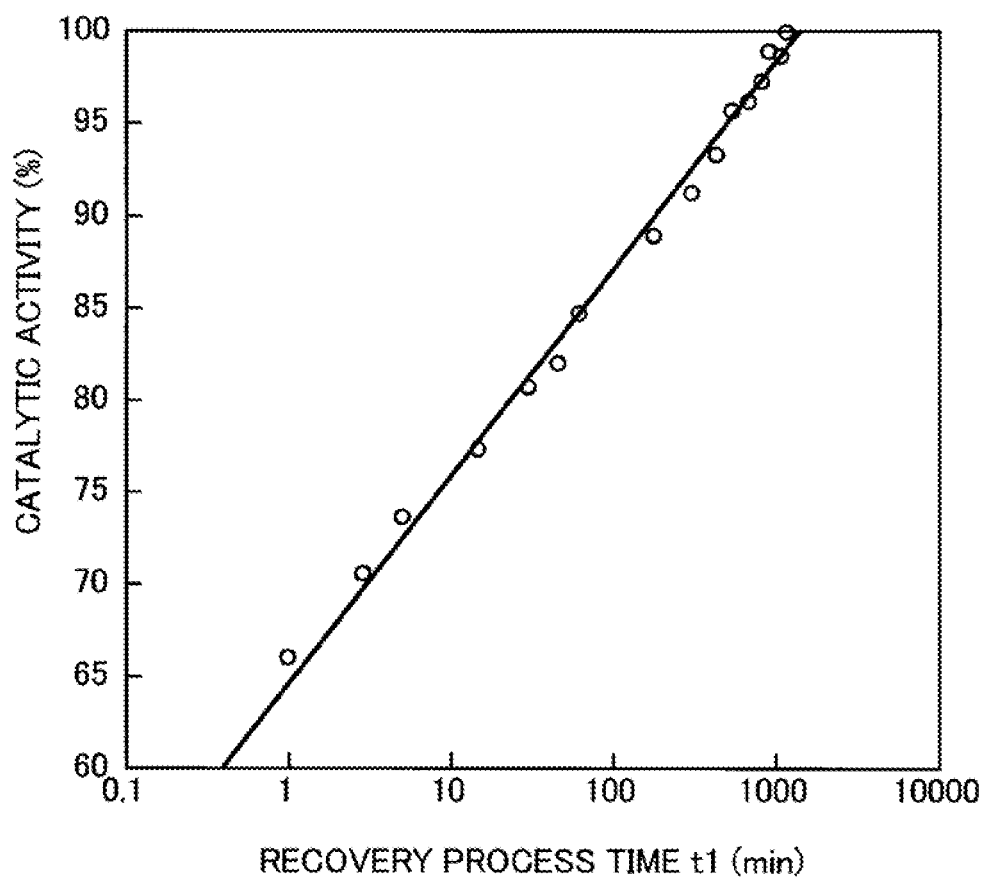
FIG. 5 is a diagram illustrating the relationship between the catalytic activity of the fuel cells and the recovery process time.

FIG. 5 is a diagram illustrating the relationship between the catalytic activity of the fuel cells 10 and the recovery process time t1. The catalytic activity was set to 100% at the time of measurement of the initial cell voltage V0 of the fuel cells 10 and was subsequently lowered to 60%. The recovery process voltage Vt1 was set to 0.05 V, and the relationship between the catalytic activity of the fuel cells 10 and the recovery process time t1 was measured and shown in the form of a graph. As clearly understood from the graph, the catalytic activity has approximately linear relationship to the logarithm of the recovery process time t1. Increasing the recovery process time t1 thus leads to an increase in recovery of the catalytic activity. It seems that the recovery process time t1 should be 1000 minutes for recovery of the catalytic activity to approximately 100%. In the actual fuel cell vehicle, however, performing the catalyst recovery process, for example, at every vehicle stop to wait for a traffic light does not reduce the catalytic activity to 60%. The catalytic activity is thus recoverable in a shorter time.

At step S150 in FIG. 3, the controller 20 sets the cell voltage V2a obtained at step S140 to the cell voltage V1b of step S125 and returns the processing flow to step S130. The controller 20 may change the map to obtain the recovery process voltage and the recovery process time for a second or subsequent recovery process. More specifically, it may be estimated that the recovery process voltage Vt1 obtained from the voltage difference $\Delta V1b$ in the first recovery process is too high or the recovery process time t1 obtained from the voltage difference $\Delta V1b$ in the first recovery process is too short. In such cases, the controller 20 may update the map to shift the recovery process voltage to a lower voltage or shift the recovery process time to a longer time and may refer to the updated map to obtain a recovery process voltage Vt2 and a recovery process time t2 for the second recovery process, based on a voltage difference $\Delta V2a$ (voltage difference $\Delta V2a=V0-V2a$). In another example, the controller 20 may not update the map but may use the original map. In this case, at step S130 for the second recovery process, the controller 20 may refer to the original map to obtain the recovery process voltage and the recovery process time and may correct the recovery process voltage read from the original map to a lower voltage or may correct the recovery process time read from the original map to a longer time.

The controller 20 similarly performs the second or subsequent recovery process. The controller 20 may obtain a cell voltage V2b in the idling state of the fuel cells 10 after the second or subsequent recovery process and may similarly repeat the recovery process when a voltage difference $\Delta V2b$ between the initial cell voltage V0 and the cell voltage V2b after the recovery process is greater than a predetermined value.

Figure 6:
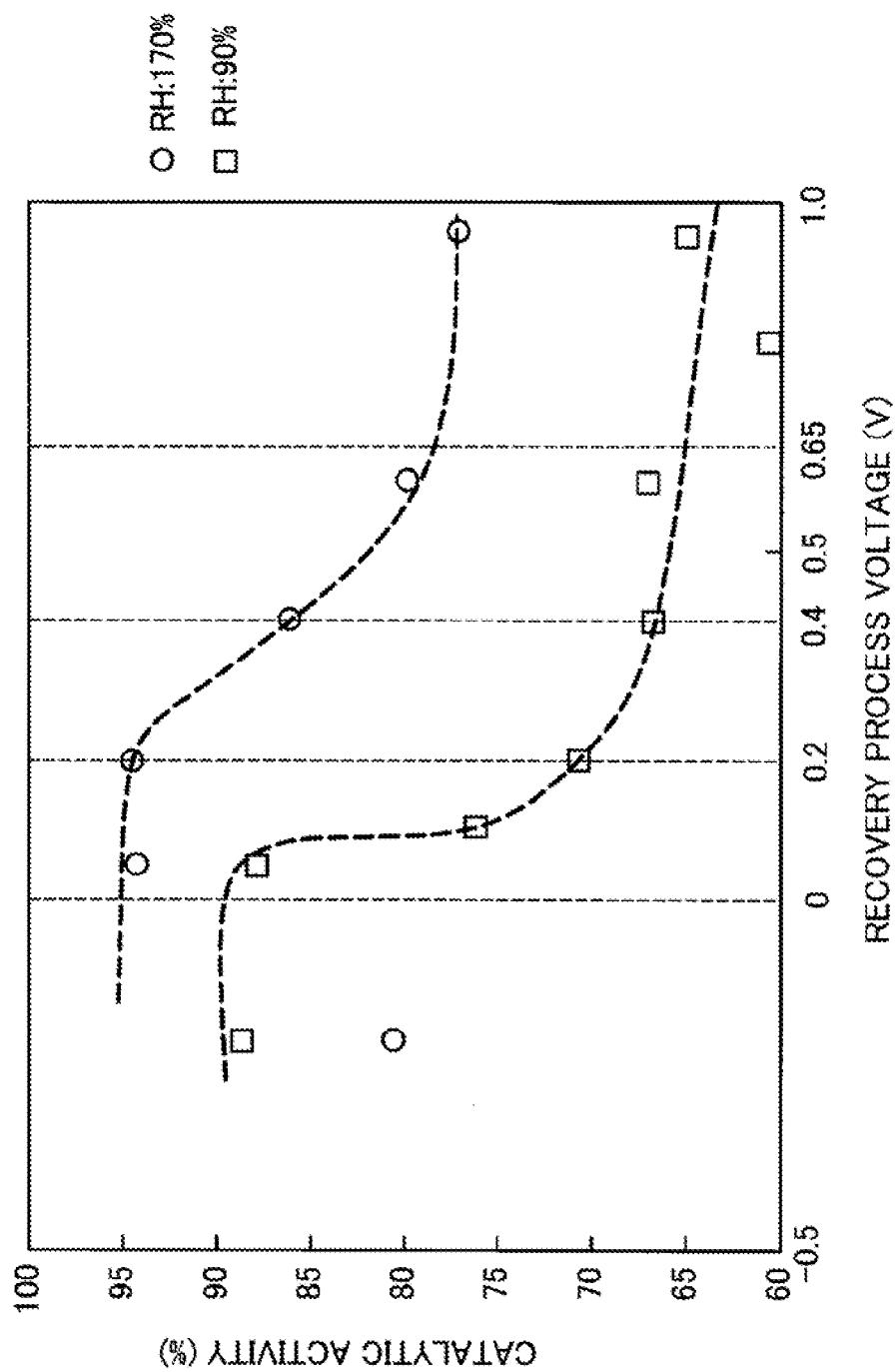
FIG. 6 is a diagram illustrating the relationship of the catalytic activity to the recovery process voltage and the relative humidity in the fuel cells.

FIG. 6 is a diagram illustrating the relationship of the catalytic activity to the recovery process voltage and the relative humidity in the fuel cells 10. At the relative humidity of 90% in the fuel cells 10, the lower recovery process voltage than 0.4 V is more likely to recover the catalytic activity. At the relative humidity of 170% in the fuel cells 10 indicating the state that the membrane electrode assembly of the fuel cells 10 is filled with liquid water, the lower recovery process voltage than 0.65V is more likely to recover the catalytic activity. In other words, the higher relative humidity of the fuel cells 10 is more likely to recovery the catalytic activity of the fuel cells 10. In general, the recovery process voltage is preferably to be lower than 0.4 V and is more preferably to be lower than 0.2 V.

Reducing the recovery process voltage Vt1 for recovery of the fuel cells 10 draws the high current from the fuel cells 10 and decreases the cell voltage of the power generation element 11 of the fuel cells 10 to the lower voltage. The amount of consumption of the anode gas in the fuel cells 10 is proportional to the amount of electric current. The lower recovery process voltage Vt1 thus generates more electric power that is not used for driving. This increases consumption of the anode gas and lowers the fuel consumption of the fuel cell vehicle. The longer recovery process time t1 also increases consumption of the anode gas. According to this embodiment, the controller 20 obtains the cell voltage V1*b* (or voltage V1*a*) of the power generation element 11 of the fuel cells 10, refers to the map to obtain the optimum recovery process voltage Vt1 and the optimum recovery process time t1 for minimizing consumption of the anode gas, based on the voltage difference ΔV1*b* that is the difference between the cell voltage V1*b* and the initial cell voltage V0, and performs the recovery process of the fuel cells 10. This results in reducing consumption of the anode gas during the recovery process and efficiently recovering the catalytic performance of the fuel cells 10.

Second Embodiment:

A second embodiment has a similar device configuration to the device configuration of the first embodiment but employs a different control method. According to the second embodiment, the controller 20 uses a temperature Ta of the fuel cells (temperature of cooling medium) and perform the recovery process when the temperature Ta of the fuel cells is within a predetermined range. The controller 20 also obtains the recovery process voltage Vt1 and the recovery process time t1 by using the initial cell voltage V0, the cell voltage V1*b* and the temperature Ta of the fuel cells.

Figure 7:
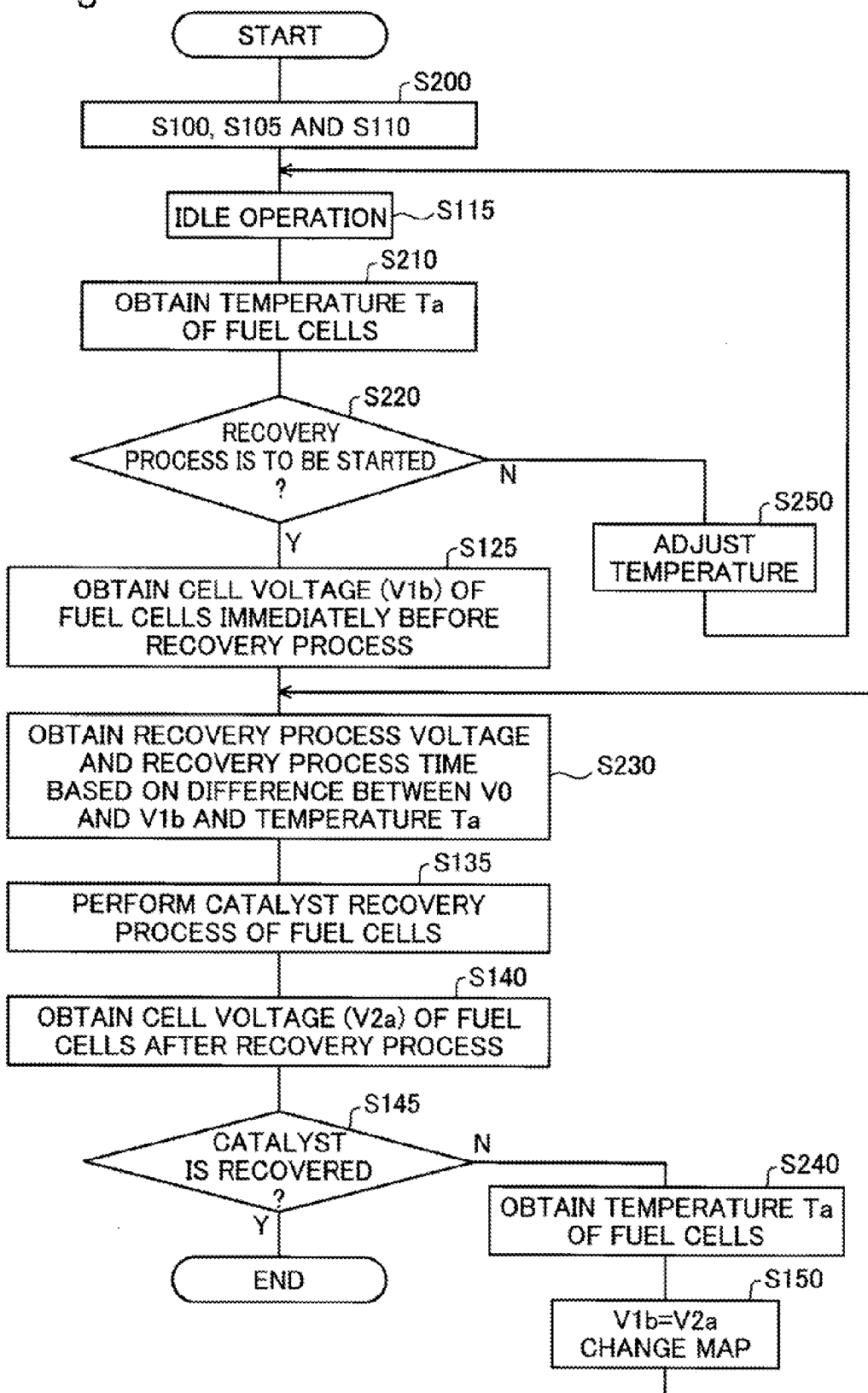
FIG. 7 is a flowchart showing a recovery process of the fuel cells according to the second embodiment.

FIG. 7 is a flowchart showing a recovery process of the fuel cells according to the second embodiment. The like processing steps in FIG. 7 to the processing steps in the flowchart of the recovery process of the fuel cells according to the first embodiment shown in FIG. 3 are shown by the like step numbers.

At step S200, the processing of steps S100, S105 and S110 shown in FIG. 3 is performed. The processing flow then proceeds to step S115. The processing of steps S100, S105, S110 and S115 is described above with reference to FIG. 3 and is not specifically described with reference to FIG. 7. The like steps to those described above with reference to FIG. 3 are not specifically described or are only briefly described.

At step S210, the controller 20 obtains a temperature Ta of the fuel cells. For example, the controller 20 may use the cooling medium temperature measurement unit 76*a* (shown in FIG. 1) to obtain the temperature of the cooling medium discharged from the fuel cells 10 and estimate or calculate the temperature of the fuel cells 10 from the temperature of the cooling medium. In another example, the controller 20 may use the electric current flowing in and the voltage of the fuel cells 10 to obtain the impedance of the fuel cells 10 and estimate or calculate the temperature of the fuel cells 10 from the impedance. At step S120 of the first embodiment shown in FIG. 3, the controller 20 determines whether the catalyst recovery process of the fuel cells 10 is to be started, based on the time elapsed since a start of the fuel cells 10 or the cell voltage of the power generation element 11 of the fuel cells 10 in the idling state after a vehicle stop. According to the second embodiment, the controller 20 determines whether the recovery process of the fuel cells 10 is to be started by taking into account the temperature of the fuel cells 10 in addition to the elapsed time or the cell voltage. More specifically, the controller 20 starts the catalyst recovery process of the fuel cells 10 when the temperature Ta of the fuel cells 10 is in a predetermined temperature range (Tlow to Thigh). When the temperature Ta of the fuel cells 10 is lower than the reference value Tlow, the water content in the fuel cells 10 may be condensed. This may cause the inside of the fuel cells to have excessive water content and lead to flooding. When the temperature Ta of the fuel cells 10 is higher than the reference value Thigh, on the other hand, the water content in the fuel cells 10 is vaporized. Since the inside of the fuel cells 10 is dry, it is unlikely to reduce anion poisoning by the recovery process. The controller 20 accordingly performs the recovery process when the inside of the fuel cells 10 is adequately moist. When the temperature Ta of the fuel cells 10 is lower than Tlow or higher than Thigh, the controller 20 may shift the processing flow to step S250 to adjust the temperature Ta of the fuel cells 10. More specifically, when the temperature Ta of the fuel cells 10 is lower than the reference value Tlow, the controller 20 may decrease the supply amount of the cooling medium to the fuel cells 10 to increase the temperature of the fuel cells 10. When the temperature Ta of the fuel cells 10 is higher than the reference value Thigh, on the contrary, the controller 20 may increase the supply amount of the cooling medium to the fuel cells 10 to decrease the temperature of the fuel cells 10. The controller 20 may not limit the base temperature to the temperature of cooling medium but may use the cell temperature of a power generation element 11 that is most likely to increase the temperature in the fuel cell stack as the base temperature. For example, the power generation element 11 located near the center of the fuel cell stack is more likely to increase the temperature, while the power generation element 11 located near the end of the fuel cell stack is more likely to decrease the temperature.

At step S125, the controller 20 obtains the cell voltage V1*b* immediately before the recovery process of the fuel cells 10. At step S220, the controller 20 uses the voltage difference ΔV1*b* between the initial cell voltage V0 and the cell voltage V1*b* and the temperature Ta of the fuel cells 10 to obtain a cell voltage of the power generation element 11 of the fuel cells 10 for catalyst recovery process of the fuel cells 10 (recovery process voltage Vt1) and a time when the fuel cells 10 is to be kept at the recovery process voltage (recovery process time t1).

Figure 8:
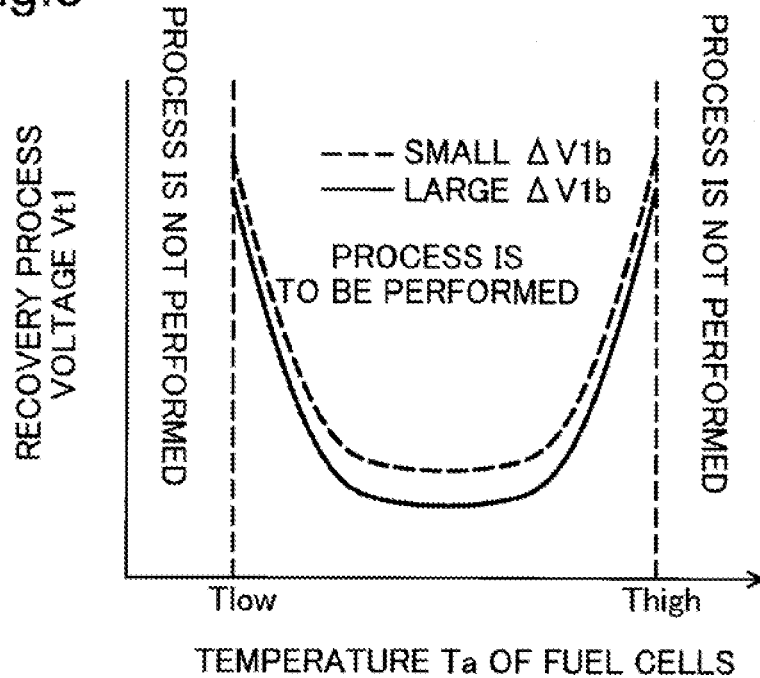
FIG. 8 is a diagram of exemplary graphs showing the relationship of the recovery process voltage to the temperature of the fuel cells.

FIG. 8 is a diagram of exemplary graphs showing the relationship of the recovery process voltage Vt1 to the temperature Ta of the fuel cells. In these graphs, the recovery process voltage Vt1 is plotted against the temperature of the fuel cells 10. The two graphs respectively show the relationships in the case of a large voltage difference ΔV1*b* between the initial cell voltage V0 and the cell voltage V1*b* and in the case of a small voltage difference ΔV1*b*. The controller 20 minimizes the recovery process voltage Vt1 when the temperature Ta of the fuel cells 10 is an intermediate temperature between the reference value Tlow and the reference value Thigh, and increases the recovery process voltage Vt1 with both an increase in temperature Ta of the fuel cells 10 and a decrease in temperature Ta of the fuel cells 10 from the intermediate temperature. When the voltage difference ΔV1*b* is greater than a predetermined value, the controller 20 refers to a predefined map to decrease the recovery process voltage Vt1. The temperature that minimizes the recovery process voltage Vt1 may be varied with a variation in voltage difference ΔV1*b*.

Figure 9:
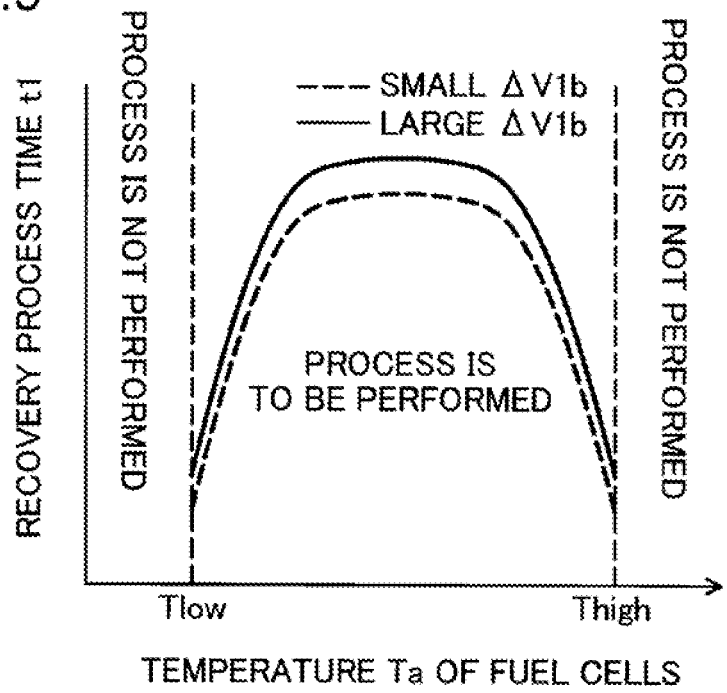
FIG. 9 is a diagram of exemplary graphs showing the relationship of the recovery process time to the temperature of the fuel cells.

FIG. 9 is a diagram of exemplary graphs showing the relationship of the recovery process time t1 to the temperature Ta of the fuel cells. In these graphs, the recovery process time t1 is plotted against the temperature of the fuel cells 10. The two graphs respectively show the relationships in the case of a large voltage difference ΔV1*b* between the initial cell voltage V0 and the cell voltage V1*b* and in the case of a small voltage difference ΔV1b. The controller 20 maximizes the recovery process time t1 when the temperature Ta of the fuel cells 10 is an intermediate temperature between the reference value Tlow and the reference value Thigh, and decreases the recovery process time t1 with both an increase in temperature Ta of the fuel cells 10 and a decrease in temperature Ta of the fuel cells 10 from the intermediate temperature. When the voltage difference ΔV1b is greater than a predetermined value, the controller 20 refers to a predefined map to increase the recovery process time t1. The temperature that maximizes the recovery process time t1 may be varied with a variation in voltage difference ΔV1b.

At step S230 in FIG. 8, the controller 20 uses the voltage difference ΔV1b between the initial cell voltage V0 and the cell voltage V1b and the temperature Ta of the fuel cells to obtain the recovery process voltage Vt1 and the recovery process time t1. At subsequent steps S135 and S140, the controller 20 performs the same processing as that of FIG. 3. When it is determined that the catalyst is not sufficiently recovered at step S145, the controller 20 shifts the processing flow to step S240 to obtain the temperature Ta of the fuel cells 10. This is because the temperature of the fuel cells 10 may be changed during the catalyst recovery process of the fuel cells 10. The controller 20 subsequently performs the processing similar to that described above at step S150.

As described above, the second embodiment obtains the recovery process voltage Vt1 and the recovery process time t1 by using the temperature Ta of the fuel cells 10 in addition to the voltage difference ΔV1b and performs the catalyst recovery process of the fuel cells 10. Accordingly, the second embodiment allows for the more precise recovery process and ensures the efficient recovery of the catalytic performance of the fuel cells 10, compared with the first embodiment.

According to the second embodiment, when the temperature Ta of the fuel cells 10 is in the predetermined temperature range (Tlow to Thigh), the controller 20 performs the recovery process of the fuel cells 10. The lower temperature of the fuel cells 10 makes the water vapor in the fuel cells 10 more likely to be condensed and is more likely to reduce the anion poisoning by the recovery process. Accordingly, even when the temperature Ta of the fuel cells 10 is in the predetermined temperature range (Tlow to Thigh), the controller 20 may increase the supply amount of the cooling medium to the fuel cells 10 and make the temperature Ta of the fuel cells 10 closer the reference value Tlow.

Third Embodiment:

A third embodiment has a similar device configuration to the device configuration of the second embodiment but employs a different control method. According to the second embodiment, the controller 20 performs the recovery process of the fuel cells 10 when the temperature Ta of the fuel cells 10 is within the predetermined range. According to the third embodiment, the controller 20 detects the position of the gearshift lever in addition to the temperature Ta of the fuel cells 10 and changes the recovery process time. The catalyst recovery process of the fuel cells 10 is performed during idle operation after a vehicle stop as described above. When the vehicle is at stop for a long time, it is allowable to set a longer time to the recovery process time t1. The driver may change the position of the gearshift lever to P (parking) or N (neutral), for example, when waiting for a traffic light for a relatively long time. The driver may additionally apply the parking brake. In such cases, the controller 20 may set a longer time to the recovery process time t. The parking brake may be a hand-operated type or a foot-operated type. Both the hand operation and the foot operation of the parking brake are expressed as application of the parking brake in the description herein.

Figure 10:
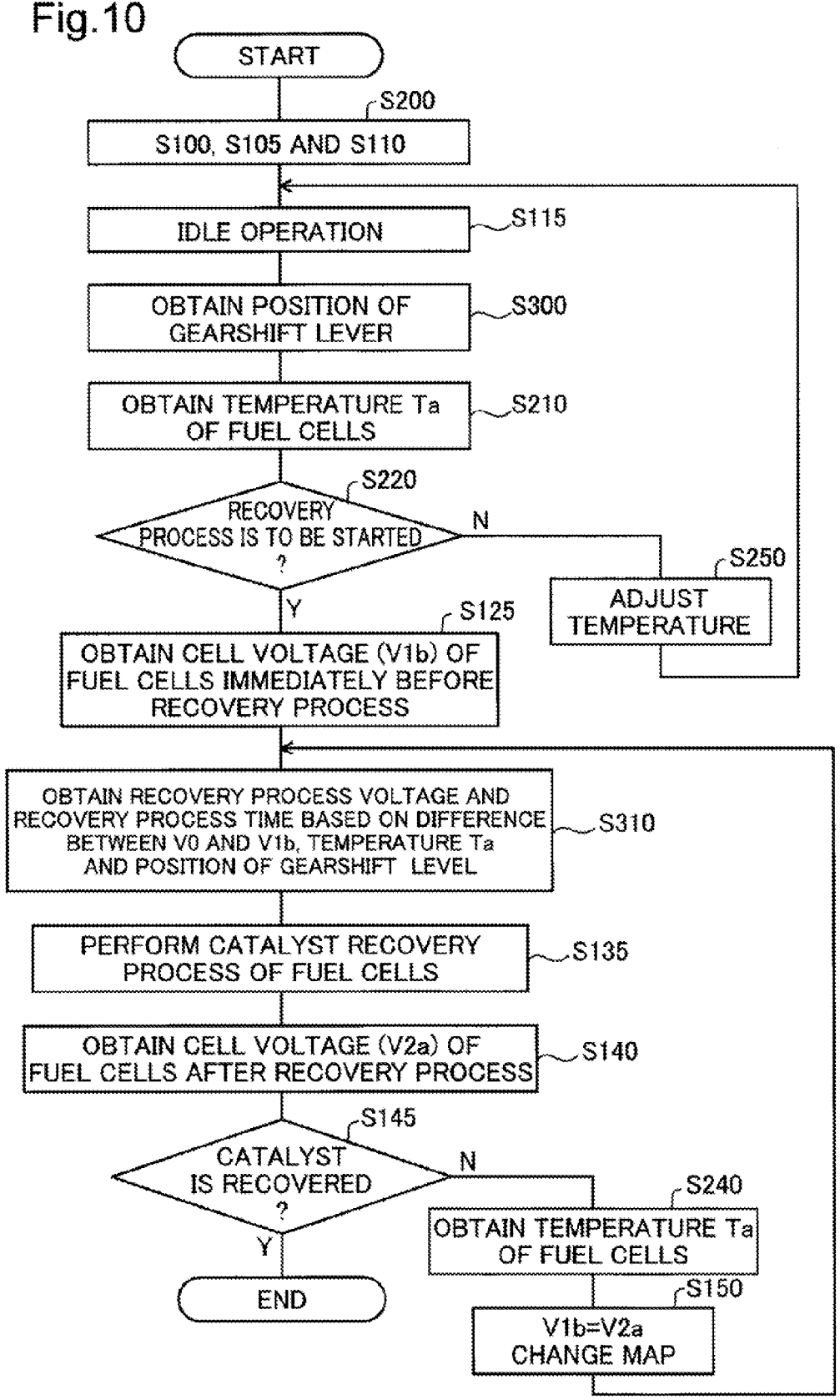
FIG. 10 is a flowchart showing a catalyst recovery process of the fuel cells according to the third embodiment.

FIG. 10 is a flowchart showing a catalyst recovery process of the fuel cells according to the third embodiment. The like processing steps in FIG. 10 to the processing steps in the flowchart of the catalyst recovery process of the fuel cells according to the first embodiment shown in FIG. 3 or the processing steps in the flowchart of the catalyst recovery process of the fuel cells according to the second embodiment shown in FIG. 7 are shown by the like step numbers and are not specifically described here.

The processing of step S200 (S100, S105 and S110) and step S115 is identical with the processing described above with reference to FIGS. 3 and 7. At subsequent step S300, the controller 20 obtains the position of the gearshift lever. The processing of steps S210, S220 and S125 is identical with the processing described above with reference to FIG. 7. At step S310, the controller 20 uses the voltage difference ΔV1b between the initial cell voltage V0 and the cell voltage V1b, the temperature Ta of the fuel cells 10 and the position of the gearshift lever to obtain the recovery process voltage Vt1 and the recovery process time t1 for the recovery process of the catalyst of the fuel cells 10.

Figure 11:
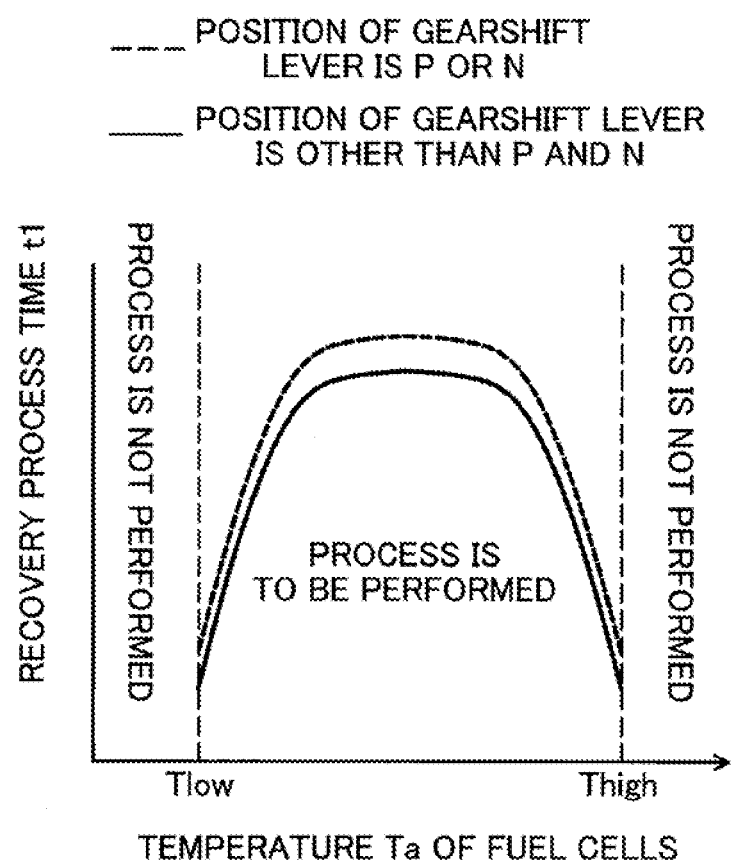
FIG. 11 is a diagram of exemplary graphs showing the relationship of the recovery process time to the temperature of the fuel cells.

FIG. 11 is a diagram of exemplary graphs showing the relationship of the recovery process time t1 to the temperature Ta of the fuel cells. FIG. 11 shows the graph at the position of the gearshift lever of P or N and the graph at the position of the gearshift lever of other than P and N. The controller 20 sets the longer recovery process time t1 at the position of the gearshift lever of P or N than that at the position of the gearshift lever of other than P and N. When the parking brake is applied at the position of the gearshift lever of N, the controller 20 may further increase the recovery process time t1. The controller 20 may refer to different maps corresponding to different gearshift positions.

The processing of and after step S135 in FIG. 10 is similar to the processing described in the second embodiment and is thus not specifically described here.

As described above, the third embodiment allows the recovery process time t1 of the catalyst of the fuel cells 10 to be increased when the position of the gearshift lever indicates a vehicle stop for a relatively long time or more specifically the possibility of idle operation for a relatively long time.

According to the third embodiment, the controller 20 increases the recovery process time t1 of the fuel cells 10 based on the position of the gearshift lever. According to a modification, the recovery process time t of the catalyst of the fuel cells 10 may be increased under the condition of a large brake pedal force. According to another modification, the recovery process time t1 of the catalyst of the fuel cells 10 may be increased when the parking brake is applied in addition to the brake pedal force.

Fourth Embodiment:

In the first to the third embodiments, in the recovery process of the fuel cells 10, the controller 20 controls the electric current drawn by the DC/DC converter 82 to lower the cell voltage of the power generation element 11 of the fuel cells 10 and perform the recovery process. According to a fourth embodiment, on the other hand, the controller 20 decreases the amount of the cathode gas supplied to the fuel cells 10 to lower the cell voltage of the power generation element 11 of the fuel cells 10. More specifically, the controller 20 decreases the supply amount of the cathode gas to the fuel cells 10 to suppress the reaction for power generation in the fuel cells 10, thus lowering the cell voltage of the power generation element 11 of the fuel cells 10.

During normal operation of the fuel cells 10, the high-pressure air (cathode gas) fed from the air compressor 32 is fed to the humidifier 35. During recovery process of the fuel cells 10, on the other hand, the cathode gas fed from the air compressor 32 is divided into two directions by the bypass valve 36. Part of the cathode gas is flowed through the cathode gas bypass piping 37 into the cathode off gas piping 41, while the remaining part of the cathode gas is supplied through the humidifier 35 to the fuel cells 10. In other words, the controller 20 controls the opening and closing of the bypass valve 36 to decrease the amount of the cathode gas supplied to the fuel cells 10, so as to lower the cell voltage of the power generation element 11 of the fuel cells 10 and perform the recovery process.

Figure 12:
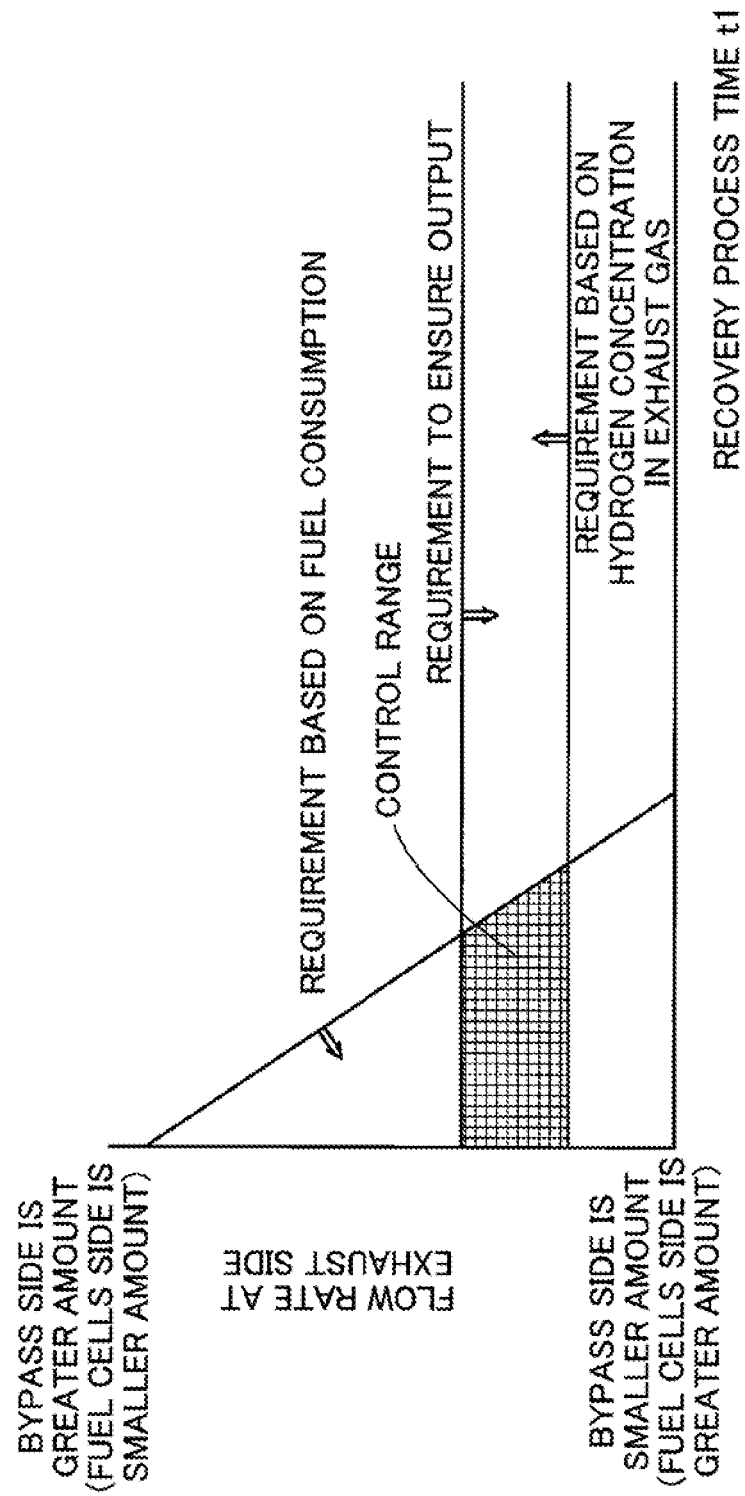
FIG. 12 is a diagram illustrating the relationship between the recovery process time for the recovery process of the fuel cells and the amount of the cathode gas to be bypassed from the fuel cells.

FIG. 12 is a diagram illustrating the relationship between the recovery process time for the recovery process of the fuel cells 10 and the amount of the cathode gas to be bypassed from the fuel cells 10. The abscissa shows the recovery process time t1, and the ordinate shows the amount of the cathode gas flowing through the cathode gas bypass piping 37 into the cathode off gas piping 41. Accordingly, the upper area in FIG. 12 indicates the greater bypass amount of the cathode gas and the smaller amount of the cathode gas supplied to the fuel cells 10. The lower area in FIG. 12 indicates the smaller bypass amount of the cathode gas and the greater amount of the cathode gas supplied to the fuel cells 10.

Three lines are drawn in FIG. 12. The upper line out of two horizontal lines parallel to the abscissa determined in terms of ensuring the output of the fuel cells 10. Even during idle operation, the fuel cell vehicle consumes electric power for air conditioning and the like. For this purpose, the fuel cells 10 outputs the minimum required electric power. The bypass amount of the cathode gas should thus be smaller than the amount specified by this line. The electric power consumed for air conditioning and the like is varied according to, for example, the ambient temperature. The height of this line may thus be changed according to the ambient temperature. This line may be determined based on the power consumption during idling.

The lower line out of the two horizontal lines parallel to the abscissa is determined based on the hydrogen concentration in the exhaust gas. According to this embodiment, the anode off gas including unreacted hydrogen is flowed to the cathode off gas piping 41 and is discharged. The lower hydrogen concentration in the exhaust gas is preferable. The lower line is determined based on the amount of the anode gas (the air) required to control the hydrogen concentration in the exhaust gas to or below a specified level. The bypass amount of the cathode gas should thus be greater than the amount specified by this line.

The diagonal line is determined based on the fuel consumption of the fuel cells 10. A decrease in cell voltage of the power generation element 11 of the fuel cells 10 increases the electric current according to the characteristics of the fuel cells 10 and thereby increases the amount of fuel consumption. In terms of the fuel consumption, the controller 20 is not allowed to decrease the voltage of the fuel cells in the case of the long recovery process time t1. The controller 20 accordingly decreases the amount of the cathode gas flowed to the fuel cells 10 (i.e., increases the bypass amount) in the case of the long recovery process time t1, compared with the amount in the case of the short recovery process time t1. The bypass amount of the cathode gas should thus be the amount in the lower left area of this line.

As described above, according to the fourth embodiment, the controller 20 performs the recovery process of the fuel cells 10 such that the relationship between the recovery process time t1 and the bypass amount of the cathode gas is included in the range defined by the above three lines (hatched area in FIG. 12). This allows for the efficient recovery process without lowering the fuel consumption and causing shortage of electric power.

The foregoing describes some aspects of the invention with reference to some embodiments. The embodiments of the invention described above are provided only for the purpose of facilitating the understanding of the invention and not for the purpose of limiting the invention in any sense. The invention may be changed, modified and altered without departing from the scope of the invention and includes equivalents thereof.

REFERENCE SIGNS LIST

10 . . . fuel cells
11 . . . power generation element
20 . . . controller
30 . . . cathode gas supply assembly
31 . . . cathode gas piping
32 . . . air compressor
33 . . . air flow meter
34 . . . on-off valve
35 . . . humidifier
36 . . . bypass valve
37 . . . cathode gas bypass piping
40 . . . cathode gas discharge assembly
41 . . . cathode off gas piping
43 . . . pressure regulator
44 . . . pressure measurement unit
50 . . . anode gas supply assembly
51 . . . anode gas piping
52 . . . hydrogen tank
53 . . . on-off valve
54 . . . regulator
55 . . . hydrogen supply unit
56 . . . pressure measurement unit
60 . . . anode gas circulation/discharge assembly
61 . . . anode off gas piping
62 . . . gas liquid separator.
63 . . . anode gas circulation piping
64 . . . hydrogen circulation pump
65 . . . anode water discharge piping
66 . . . water discharge valve
67 . . . pressure measurement unit
68 . . . anode off gas discharge valve
69 . . . anode off gas discharge piping
70 . . . cooling medium supply assembly
71 . . . cooling medium piping
71a . . . upstream-side piping
71b . . . downstream-side piping
72 . . . radiator
73 . . . three-way valve
75 . . . cooling medium circulation pump
76a . . . cooling medium temperature measurement unit
81 . . . secondary battery
91 . . . cell voltage measurement unit
92 . . . current measurement unit
93 . . . impedance measurement unit
95 . . . on-off switch
100 . . . fuel cell system
101 . . . ambient temperature sensor
102 . . . vehicle speed sensor
103 . . . gearshift lever sensor
104 . . . accelerator 200 . . . motor
DCL . . . DC line
Ta . . . temperature
Tlow . . . reference value
Thigh . . . reference value
t1 . . . recovery process time
t2 . . . recovery process time
V0 . . . initial cell voltage
V1 . . . cell voltage
V1a . . . cell voltage.
V1b . . . cell voltage
V2a . . . cell voltage.
V2b . . . cell voltage
Vt1 . . . recovery process voltage
Vt2 . . . recovery process voltage
ΔV1a . . . voltage difference
ΔV1b . . . voltage difference
ΔV2a . . . voltage difference
ΔV2v . . . voltage difference

The invention claimed is:

1. A control method of a fuel cell system to be mounted on a fuel cell vehicle and includes fuel cells having a platinum-containing catalyst as an electrode catalyst, the control method comprising the steps of:
   (a) obtaining a first cell voltage of the fuel cells in a predefined idling state state;
   (b) in response to a change in operation state of the fuel cell vehicle from a driving state to a stop state, changing an operation state of the fuel cell vehicle to the idling state and obtaining a second cell voltage of the fuel cells in the idling state;
   (c) using a difference between the first cell voltage and the second cell voltage to obtain a recovery process voltage for recovering the catalyst of the fuel cells and a recovery process time duration in which the cell voltage of the fuel cells is to be kept at the recovery process voltage; and
   (d) reducing the voltage of the fuel cells to the recovery process voltage for the recovery process time duration, so as to perform a recovery process of the catalyst.

2. The control method of the fuel cell system according to claim 1,
   wherein the step (b) comprises a step of reducing the cell voltage of the fuel cells to or below 0.6 V before changing the operation state of the fuel cells to the idling state.

3. The control method of the fuel cell system according to claim 1,
   wherein the step (a), prior to a change in operation state of the fuel cell vehicle to the driving state after a start of the fuel cells, comprises a step of reducing the cell voltage of the fuel cells to or below 0.6V and changing the operation state of the fuel cell vehicle to the idling state, and then obtaining a cell voltage in the idling state as the first cell voltage.

4. The control method of the fuel cell system according to claim 1,
   wherein when the difference between the first cell voltage and the second cell voltage is greater than a predetermined value, the recovery process voltage is decreased than when the difference between the first cell voltage and the second cell voltage is equal to the predetermined value.

5. The control method of the fuel cell system according to claim 1,
   wherein when the difference between the first cell voltage and the second cell voltage is greater than a predetermined value, the recovery process time duration is increased than the when the difference between the first cell voltage and the second cell voltage is equal to the predetermined value.

6. The control method of the fuel cell system according to claim 1, further comprising the steps of:
   (e) after the recovery process, changing the operation state of the fuel cell vehicle to the idling state, and newly obtaining the second cell voltage of the fuel cells in the idling state, and
   (f) when a difference between the newly obtained second cell voltage and the first cell voltage is greater than a specified range, using the difference between the first cell voltage and the newly obtained second cell voltage to obtain the recovery process voltage and the recovery process time.

7. The control method of the fuel cell system according to claim 6,
   wherein when the difference between the first cell voltage and the second cell voltage obtained in the step (b) is equal to the difference between the first cell voltage and the second cell voltage obtained in the step (e), the recovery process voltage obtained in the step (f) is lower than the recovery process voltage obtained in the step (c).

8. The control method of the fuel cell system according to claim 6,
   wherein when the difference between the first cell voltage and the second cell voltage obtained in the step (b) is equal to the difference between the first cell voltage and the second cell voltage obtained in the step (e), the recovery process time duration obtained in the step (f) is longer than the recovery process time duration obtained in the step (c).

9. The control method of the fuel cell system according to claim 1, further comprising the steps of:
   detecting a wet state of the fuel cells; and
   obtaining the recovery process voltage and the recovery process time duration, based on the difference between the first cell voltage and the second cell voltage and the wet state.

10. The control method of the fuel cell system according to claim 1, further comprising the steps of:
    obtaining a temperature of the fuel cells; and
    performing the recovery process when the temperature of the fuel cells is between a predetermined first temperature and a predetermined second temperature inclusive.

11. The control method of the fuel cell system according to claim 10,
    wherein the recovery process voltage is minimized when the temperature of the fuel cells is equal to a predetermined third temperature that is between the first temperature and the second temperature,
    the recovery process voltage is increased as the temperature of the fuel cells approaches from the third temperature to the first temperature, and
    the recovery process voltage is increased as the temperature of the fuel cells approaches from the third temperature to the second temperature.

12. The control method of the fuel cell system according to claim 10,
    wherein the recovery process time is maximized when the temperature of the fuel cells is equal to a predetermined fourth temperature that is between the first temperature and the second temperature, the recovery process time duration is decreased as the temperature of the fuel cells approaches from the fourth temperature to the first temperature, and the recovery process time duration is decreased as the temperature of the fuel cells approaches from the fourth temperature to the second temperature.

13. The control method of the fuel cell system according to claim 1, further comprising the steps of:

detecting a gearshift position of the fuel cell vehicle, and increasing the recovery process time duration when the gearshift position is either a parking position or a neutral position.

14. The control method of the fuel cell system according to claim 1, further comprising the steps of:

regulating an amount of a cathode gas that is to be supplied to the fuel cells; and decreasing the amount of the cathode gas that is to be supplied to the fuel cells, so as to lower the recovery process voltage.

15. The control method of the fuel cell system according to claim 14, wherein the fuel cell system further comprises:

a cathode gas supply piping that is arranged to supply the cathode gas to the fuel cells;

a cathode gas discharge piping that is arranged to discharge a cathode off gas from the fuel cells;

a bypass valve that is provided in the cathode gas supply piping; and a bypass piping that is arranged to connect the bypass valve with the cathode gas discharge piping, the control method of the fuel cell system further comprising a step of:

increasing an amount of the cathode gas that is flowed through the bypass piping by the bypass valve, so as to decrease the amount of the cathode gas that is to be supplied to the fuel cells.

\* \* \* \* \*